US011694130B2

(12) United States Patent
Johnson et al.

(10) Patent No.: US 11,694,130 B2
(45) Date of Patent: Jul. 4, 2023

(54) SYSTEM AND METHOD FOR ASSIGNING AN AGENT TO EXECUTE AND FULFILL A TASK REQUEST

(71) Applicant: Honda Motor Co., Ltd., Tokyo (JP)

(72) Inventors: Brian W. Johnson, San Francisco, CA (US); Masaki Nara, Utsunomiya (JP); Toshiaki Takano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/197,974

(22) Filed: Nov. 21, 2018

(65) Prior Publication Data

US 2020/0160242 A1 May 21, 2020

(51) Int. Cl.
*G06Q 10/0631* (2023.01)
*G06Q 10/0633* (2023.01)

(52) U.S. Cl.
CPC ... *G06Q 10/06311* (2013.01); *G06Q 10/0633* (2013.01)

(58) Field of Classification Search
CPC .............. G06Q 10/06311; G06Q 10/0633
See application file for complete search history.

(56) References Cited

U.S. PATENT DOCUMENTS

| | | |
|---|---|---|
| 7,251,621 B1 | 7/2007 | Weng |
| 7,818,317 B1 | 10/2010 | Emigh et al. |
| 7,889,101 B2 | 2/2011 | Yokota |
| 7,974,873 B2 | 7/2011 | Simmons et al. |
| 8,768,763 B2 | 7/2014 | Horvitz et al. |
| 8,806,613 B2 | 8/2014 | Zafiroglu et al. |
| 9,356,790 B2 | 5/2016 | Zambetti et al. |
| 9,390,435 B2 | 7/2016 | Mamdani et al. |
| 9,412,086 B2 | 8/2016 | Morse et al. |
| 9,557,185 B2 | 1/2017 | Kimes |
| 9,618,346 B2 | 4/2017 | Wenneman et al. |
| 9,652,749 B2 | 5/2017 | Jayanthi et al. |
| 9,754,492 B2 | 9/2017 | Del Vecchio et al. |
| 9,830,638 B2 | 11/2017 | Ruckart et al. |
| 10,043,148 B1 * | 8/2018 | Chowdhary ....... G06Q 10/0833 |
| 10,192,553 B1 | 1/2019 | Chenier et al. |

(Continued)

OTHER PUBLICATIONS

Office Action of U.S. Appl. No. 16/197,904 dated Dec. 9, 2020, 29 pages.

(Continued)

*Primary Examiner* — Renae Feacher
(74) *Attorney, Agent, or Firm* — Rankin, Hill & Clark LLP

(57) ABSTRACT

A system and method for assigning an agent to execute and fulfill a task request that include receiving the task request that includes at least one request attribute. The system and method also include determining an agent pool to execute and fulfill the task request in accordance with the at least one request attribute and determining a plurality of candidate locations at which to execute and fulfill the task request in accordance with the at least one request attribute. The system and method additionally include assigning a task execution location and a task fulfillment location from the plurality of candidate locations at which to execute and fulfill the task request. The system and method further include assigning the agent from the agent pool to execute and fulfill the task request.

20 Claims, 11 Drawing Sheets

(56) References Cited

U.S. PATENT DOCUMENTS

| | | | |
|---|---|---|---|
| 11,176,940 B1 | 11/2021 | Zhong et al. | |
| 2004/0093274 A1 | 5/2004 | Vanska et al. | |
| 2005/0108091 A1 | 5/2005 | Sotak et al. | |
| 2005/0182773 A1 | 8/2005 | Feinsmith | |
| 2006/0265294 A1 | 11/2006 | de Sylva | |
| 2007/0067199 A1 | 3/2007 | Shine et al. | |
| 2007/0150375 A1 | 6/2007 | Yang | |
| 2007/0168215 A1 | 7/2007 | Tang | |
| 2007/0255611 A1* | 11/2007 | Mezo | G06Q 30/02 235/381 |
| 2008/0005168 A1 | 1/2008 | Huff et al. | |
| 2008/0140597 A1* | 6/2008 | Satir | G06Q 10/04 706/46 |
| 2009/0239552 A1 | 9/2009 | Churchill et al. | |
| 2010/0114944 A1 | 5/2010 | Adler et al. | |
| 2010/0211428 A1* | 8/2010 | Duffy | G06Q 10/1093 705/7.14 |
| 2011/0055046 A1* | 3/2011 | Bowen | G06Q 30/0623 707/802 |
| 2011/0137700 A1 | 6/2011 | Hämäläinen | |
| 2011/0145822 A1 | 6/2011 | Rowe et al. | |
| 2012/0035952 A1 | 2/2012 | Coyne | |
| 2012/0123674 A1 | 5/2012 | Perks et al. | |
| 2013/0124362 A1 | 5/2013 | Katcher | |
| 2014/0095167 A1 | 4/2014 | Lynch et al. | |
| 2014/0156327 A1* | 6/2014 | Cai | G06Q 10/063112 705/7.14 |
| 2014/0180865 A1 | 6/2014 | Argue et al. | |
| 2014/0256361 A1 | 9/2014 | Gailey et al. | |
| 2014/0258193 A1* | 9/2014 | Christophel | G06F 17/11 706/13 |
| 2014/0278642 A1* | 9/2014 | Robinson | G06Q 10/063114 705/7.15 |
| 2014/0297743 A1 | 10/2014 | Zyto et al. | |
| 2014/0314225 A1* | 10/2014 | Riahi | H04L 51/02 379/265.09 |
| 2015/0006222 A1 | 1/2015 | Isherwood et al. | |
| 2015/0142594 A1 | 5/2015 | Lutnick et al. | |
| 2015/0161563 A1 | 6/2015 | Mehrabi | |
| 2015/0221015 A1 | 8/2015 | Laha | |
| 2015/0356501 A1* | 12/2015 | Gorjestani | G06Q 10/0833 705/333 |
| 2015/0356519 A1 | 12/2015 | Wansley et al. | |
| 2016/0042735 A1 | 2/2016 | Vibbert et al. | |
| 2016/0048905 A1 | 2/2016 | Yuan | |
| 2016/0078773 A1 | 3/2016 | Carter et al. | |
| 2016/0104113 A1 | 4/2016 | Gorlin | |
| 2016/0155072 A1 | 6/2016 | Prodromidis et al. | |
| 2016/0247109 A1* | 8/2016 | Scicluna | G06Q 10/06315 |
| 2016/0283480 A1* | 9/2016 | Zhuang | H04L 67/1004 |
| 2016/0300178 A1* | 10/2016 | Perry | G06Q 10/063112 |
| 2016/0314452 A1 | 10/2016 | Pochic et al. | |
| 2016/0336024 A1 | 11/2016 | Choi et al. | |
| 2017/0039505 A1* | 2/2017 | Prabhakara | G06Q 10/063118 |
| 2017/0069013 A1 | 3/2017 | Castillo | |
| 2017/0345115 A1 | 11/2017 | Haparnas et al. | |
| 2017/0372403 A1 | 12/2017 | Jouhikainen et al. | |
| 2018/0096684 A1 | 4/2018 | Goote et al. | |
| 2018/0122378 A1 | 5/2018 | Mixter et al. | |
| 2018/0314891 A1 | 11/2018 | Ota et al. | |
| 2018/0341891 A1* | 11/2018 | Setchell | G06Q 10/10 |
| 2019/0050880 A1 | 2/2019 | Paul et al. | |
| 2019/0066677 A1 | 2/2019 | Jaygarl et al. | |
| 2019/0081810 A1 | 3/2019 | Jung | |
| 2019/0213528 A1* | 7/2019 | Gupta | G06Q 10/10 |
| 2019/0317526 A1 | 10/2019 | Goldman et al. | |
| 2019/0394289 A1* | 12/2019 | Lehrian | H04L 67/306 |
| 2020/0026534 A1 | 1/2020 | Engelhardt | |
| 2020/0034757 A1* | 1/2020 | Gupta | G06Q 10/047 |
| 2020/0228445 A1 | 7/2020 | Nishikawa et al. | |
| 2020/0265375 A1* | 8/2020 | Azad | G06Q 10/087 |

OTHER PUBLICATIONS

Office Action of U.S. Appl. No. 16/197,904 dated Jun. 12, 2020, 25 pages.
Office Action of U.S. Appl. No. 16/197,904 dated Oct. 26, 2021, 30 pages.
Office Action of U.S. Appl. No. 16/197,904 dated Apr. 12, 2022, 37 pages.
Office Action of U.S. Appl. No. 16/197,904 dated Aug. 1, 2022, 21 pages.
Notice of Allowance of U.S. Appl. No. 16/197,904 dated Feb. 15, 2023, 22 pages.

* cited by examiner

| TASKS | STATUS | ASSIGNED AGENT | DATE STAMP | EXECUTION TIME STAMP | FULFILLMENT TIME STAMP |
|---|---|---|---|---|---|
| GROCERY PICKUP: GROCERY LIST ATTACHED TO TASK | TASK REQUEST | TBD | 7/7/2018 | | |
| AIRPORT DROPOFF: ITINERARY ATTACHED TO TASK | UNASSIGNED | TBD | 7/11/2018 | 1:00PM EDT | 2:30PM EDT |
| AIRPORT PICKUP: ITINERARY ATTACHED TO TASK | UNASSIGNED | TBD | 7/11/2018 | 2:45PM EDT | 3:45PM EDT |
| SCHOOL PICKUP: MIKE SMITH: POI: MIKE'S SCHOOL | ASSIGNED | BOB SMITH | 6/30/2018 | 3:00PM EDT | 3:10PM EDT |
| DRYCLEANING PICKUP: POI: DRYCLEANER | FULFILLED | JANE SMITH | 6/28/2018 | 10:00PM EDT | 10:30PM EDT |

FIG. 2

| PREFERRED AGENT | AGENT ADDRESS | AGENT TYPE | REQUESTOR RELATIONSHIP | SAME RESIDENCE AS REQUESTOR | AGENT PRIORITY | TASK CATEGORY | TASK TIMEFRAME |
|---|---|---|---|---|---|---|---|
| BOB SMITH | 123 LAKE ROAD... | FAMILY | ADULT SON | NO | 1 | ANY | 11:00AM-9:00PM |
| JANE SMITH | 345 LAKE SHORE R... | FAMILY | SPOUSE | YES | 1 | SCHOOL PICKUP/DROPOFF | ANY |
| SAM SMITH | 345 LAKE SHORE R... | FAMILY | MINOR TEENAGE SON | YES | 2 | ANY | 8:00-8:00PM |
| ABC CAR SERVICE | 23 MAIN STREET... | THIRD-PARTY | PREFERRED THIRD-PARTY | N/A | 1 | AIRPORT PICKUP/DROPOFF | ANY |
| XYZ FOOD DELIVERY | 44 STATE STREET... | THIRD-PARTY | PREFERRED THIRD-PARTY | N/A | 1 | RESTAURANT FOOD DELIVERY | ANY |
| YYZ FOOD DELIVERY | 66 ACOSTA STREET... | THIRD-PARTY | PREFERRED THIRD-PARTY | N/A | 2 | RESTAURANT FOOD DELIVERY | ANY |

FIG. 3

| POI (402) | POI ADDRESS (406) | CATEGORY (408) | HOURS OF OPERATION (410) | CATEGORY PRIORITY (412) |
|---|---|---|---|---|
| HOME | 123 LAKE ROAD... | HOME | N/A | |
| BOB SMITH HOME | 123 LAKE ROAD... | HOME-SON | | |
| HANK'S GROCERY | 34 SOUTH APPLE RO... | GROCERY STORE | 9:00 AM EDT - 9:00 AM EDT | 1 |
| AL'S PIZZA | 21 SAN JOSE ROAD | PIZZA RESTAURANT | 11:00 AM EDT - 10:00 PM EDT | 1 |
| DAY DRYCLEANER | 44 MAIN STREET... | DRY CLEANING SERVICE | 9:00 AM EDT - 9:00 AM EDT | 1 |
| MARIO'S PIZZA | 40 MAIN STREET... | PIZZA RESTAURANT | 11:00 AM EDT - 10:00 PM EDT | 2 |
| FOOD DELIVERY EXPRESS | 52 ARTHUR DRIVE | DINING DELIVERY SERVICE | 11:00 AM EDT - 11:00 PM EDT | 1 |

FIG. 4

SYSTEM AND METHOD FOR ASSIGNING AN AGENT TO EXECUTE AND FULFILL A TASK REQUEST

BACKGROUND

In many instances, an individual may wish to request a task such as a service or a retrieval of a specific good. Currently, if the individual wishes to have an agent (e.g., a third-party) facilitate the request, the individual must find a particular agent to do so. Therefore, the individual may have to search through various channels to find a particular agent that may facilitate the request in a manner that is suitable to the individual. In some circumstances the individual may require the agent to urgently facilitate the request. In such cases, the individual may need to spend a long period of time contacting various vendors and/or service providers to facilitate the urgent request to ensure that an agent may be found that fulfills the request in an urgent manner. Additionally, the individual may need to spend a long period of time researching various internet websites, applications, and/or may need to travel to various locations in order for the request to be properly fulfilled.

BRIEF DESCRIPTION

According to one aspect, a computer-implemented method for assigning an agent to execute and fulfill a task request that includes receiving the task request that includes at least one request attribute. The computer-implemented method also includes determining an agent pool to execute and fulfill the task request in accordance with the at least one request attribute and determining a plurality of candidate locations at which to execute and fulfill the task request in accordance with the at least one request attribute. The computer-implemented method additionally includes assigning a task execution location and a task fulfillment location from the plurality of candidate locations at which to execute and fulfill the task request. The computer-implemented method further includes assigning the agent from the agent pool to execute and fulfill the task request.

According to another aspect, a system for assigning an agent to execute and fulfill a task request that includes a memory storing instructions when executed by a processor cause the processor to receive the task request that includes at least one request attribute. The instructions also cause the processor to determine an agent pool to execute and fulfill the task request in accordance with the at least one request attribute and determine a plurality of candidate locations at which to execute and fulfill the task request in accordance with the at least one request attribute. The instructions additionally cause the processor to assign a task execution location and a task fulfillment location from the plurality of candidate locations at which to execute and fulfill the task request. The instructions further cause the processor to assign the agent from the agent pool to execute and fulfill the task request.

According to still another aspect, a computer readable storage medium storing instructions that when executed by a computer, which includes at least a processor, causes the computer to perform a method that includes receiving a task request that includes at least one request attribute. The instructions also include determining an agent pool to execute and fulfill the task request in accordance with the at least one request attribute and determining a plurality of candidate locations at which to execute and fulfill the task request in accordance with the at least one request attribute. The instructions additionally include assigning a task execution location and a task fulfillment location from the plurality of candidate locations at which to execute and fulfill the task request. The instructions further include assigning an agent from the agent pool to execute and fulfill the task request.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2 is an illustrative example of a subset of fields of a task database according to an exemplary embodiment;

FIG. 3 is an illustrative example of a preferred agent database according to an exemplary embodiment;

FIG. 4 is an illustrative example of a point of interest database according to an exemplary embodiment;

DETAILED DESCRIPTION

Figure 1A:
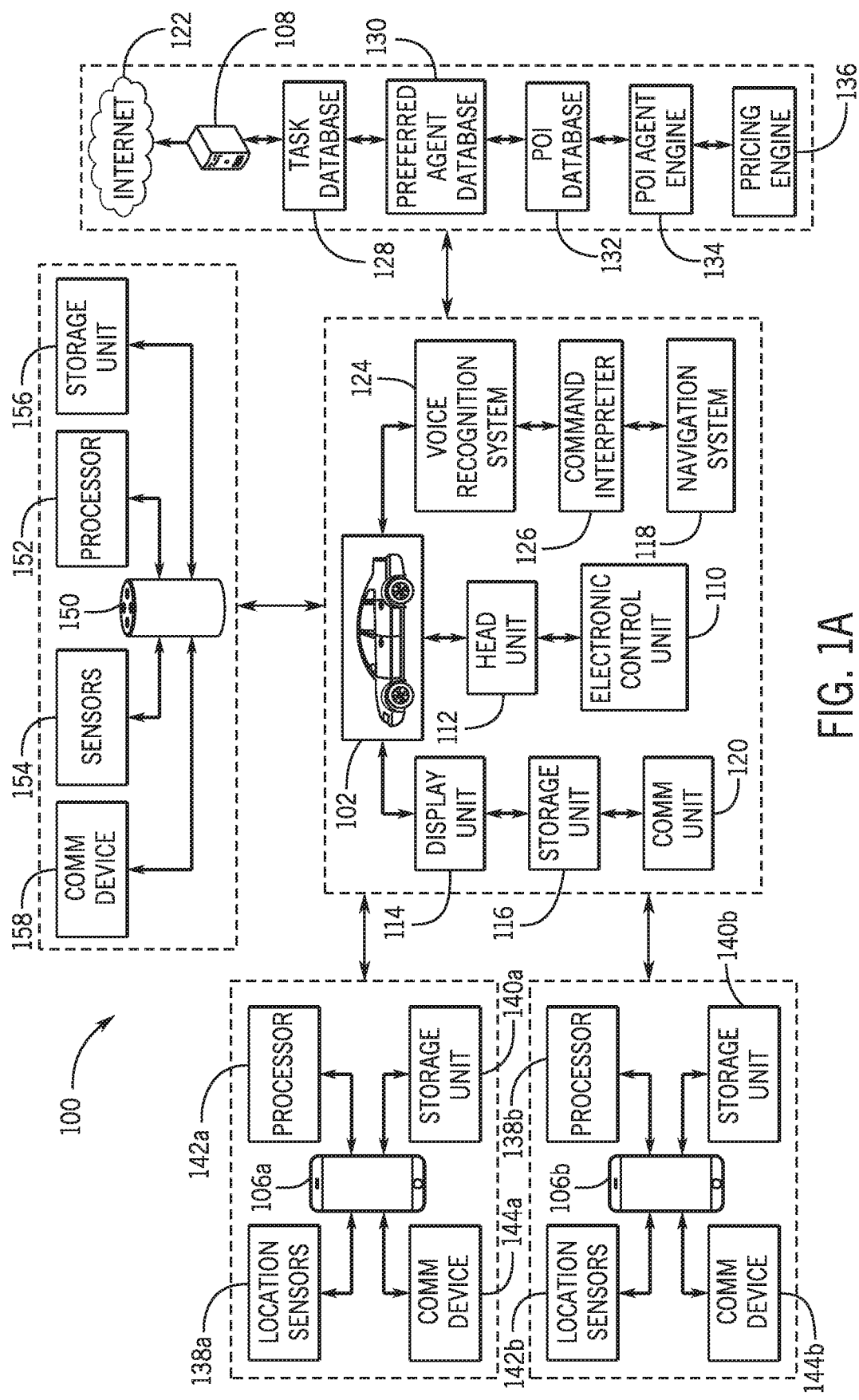
FIG. 1A is a schematic view of an exemplary operating environment of a request assignment system according to an exemplary embodiment.

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. SYSTEM OVERVIEW

Referring now to the drawings, wherein the showings are for purposes of illustrating one or more exemplary embodiments and not for purposes of limiting the same, FIG. 1A is a schematic view of an exemplary operating environment of a request assignment system 100 according to an exemplary embodiment of the present disclosure. The components of the request assignment system 100, as well as the components of other systems, hardware architectures and software architectures discussed herein, may be combined, omitted or organized into different architecture for various embodiments. However, the exemplary embodiments discussed herein focus on the system 100 as illustrated in FIG. 1A, with corresponding system components, and related methods.

As shown in the illustrated embodiment of FIG. 1A, the system 100 may include a vehicle 102 that may include one or more users of a task request assignment application 104 (task assignment application) (shown in FIG. 1B) that are located within the vehicle 102. In some cases, the user(s) may be located outside of the vehicle 102 (e.g., at a residence, workplace, walking outside, etc.). In one embodiment, the user(s) may be include a requestor (not shown) of a task request or one or more agents (not shown) (e.g., designated family members of the requestor, friends of the requestor, commercial service providers) that may be assigned to execute and fulfill a spoken task request requested by the requestor through the application 104.

As discussed in more detail below, the task assignment application 104 may be executed by the vehicle 102, a respective portable device 106a being used by the requestor, a stand-alone computing infrastructure (e.g., desktop computer) (not shown) being used by the requestor, one or more connected devices 150 used by the requestor and/or one or more agents, a respective portable device 106b being used by each of the one or more agents, a stand-alone computing infrastructure (e.g., desktop computer) (not shown) being used by each of the one or more agents, and/or an externally hosted server infrastructure (external server) 108.

In an exemplary embodiment, the task assignment application 104 may be configured to analyze one or more data inputs that may include one or more voice inputs based on one or more statements that may be provided by the requestor within the vehicle 102, through the portable device 106a, through the stand-alone computing infrastructure, and/or to the one or more connected devices 150 used by the requestor and/or the one or more agents. The task assignment application 104 may additionally be configured to analyze one or more data inputs that may include one or more sensor inputs that may be provided by the one or more connected devices 150. The one or more connected devices 150 may include, but may not be limited to a personal electronic assistant, a smart appliance such as a smart refrigerator, and/or one or more smart objects such as a smart wallet. In some configurations, the one or more sensor inputs may be provided based on a determination by the connected device(s) 150 that a requirement associated with the requestor (utilizing the connected device(s) 150) is to be fulfilled. For example, the one or more sensor inputs may be provided based on sensing that that an air filter needs to be replaced that may be utilized by a smart HVAC unit.

As discussed below, the voice input(s) and/or the sensor input(s) may be analyzed by the application 104 and/or one or more components of the system 100 to determine one or more request attributes associated with the task request provided by the requestor. The task assignment application 104 may additionally evaluate the one or more request attributes associated with the task request to determine an agent pool 146 that may include a list that may be populated with the one or more agents (e.g., data associated with names and associated information pertaining to one or more agents) that may be based on the one or more agents that may execute and/or fulfill the task request in accordance with the request attributes associated with the task request.

As discussed below, the task assignment application 104 may also determine a plurality of candidate locations at which the task request may be executed (e.g., a requested good may be picked up, an individual may be picked up) and/or the task request may be fulfilled (e.g., the requested good may be dropped off, the individual may be dropped off). The task assignment application 104 may thereby assign a task execution location as the location at which the task request is to be executed and/or may assign a task fulfillment location as the location at which the task request is to be fulfilled based on a determined urgency of the task request.

Upon the assignment of the task execution location and/or the task fulfillment location, the task assignment application 104 may create and send an unassigned task associated with the task request to one or more agents of the agent pool 146 based on a determined urgency of the task request. The unassigned task may include one or more details pertaining to the request attributes, the task execution location and/or the task fulfillment location. The application 104 may thereby determine if one or more agents of the agent pool 146 accept the unassigned task and may assign the task to a particular agent of the agent pool 146 in order to execute and fulfill the task request in accordance with one or more request attributes associated with the task request.

With continued reference to FIG. 1A, the vehicle 102 may include a particular vehicle occupied by the requestor or may include a particular vehicle occupied by one or more respective agents. The vehicle 102 may generally include an electronic control unit (ECU) 110 that operably controls a plurality of components of the vehicle 102. In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the system 100. In one embodiment, the ECU 110 may execute one or more operating systems, applications, and/or interfaces that are associated with the vehicle 102.

In one or more configurations, the ECU 110 may be in communication with a head unit 112. The head unit 112 may include internal processing memory, an interface circuit, and bus lines (components of the head unit not shown) for transferring data, sending commands, and communicating with the components of the vehicle 102. In one or more embodiments, the ECU 110 and/or the head unit 112 may execute one or more operating systems, applications, and/or interfaces that are associated to the vehicle 102 through a display unit 114 of the head unit 112.

In particular, the display unit 114 may be disposed within a center stack area (not shown) of the vehicle 102 and may be utilized to display one or more application human machine interfaces (application HMI) to provide the requestor or the agent(s) with various types of information and/or to receive one or more inputs from the requestor or the agent(s). The display unit 114 may be capable of receiving inputs from the requestor or agent(s) occupying the vehicle 102 directly or through an associated keyboard/touchpad (not shown) In one embodiment, the application HMIs may pertain to one or more application interfaces, including one or more user interfaces associated with the task assignment application 104. As discussed below, the one or more user interfaces associated with the task assignment application 104 may be presented through the display unit 114, the respective portable device 106a used by the requestor, the connected device(s) 150 utilized by the requestor, and/or the respective portable device 106b used by the agent(s).

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110, the head unit 112, and one or more applications executed by the ECU 110 and/or the head unit 112 including the task assignment application 104.

In one embodiment, the task assignment application 104 may store application data on the storage unit 116. The application data may be retrieved by the application 104 when interpreting the task request in the form of one or more voice inputs received from the requestor, evaluating one or more sensor inputs received from the connected device(s) 150 and/or when interpreting one or more inputs provided by one or more of the agents to the application 104.

In one embodiment, the ECU 110 and/or the head unit 112 may be operably connected to a navigation system 118 of the vehicle 102. The navigation system 118 may include a global positioning sensor (not shown) that is configured to determine a current geo-location (e.g., GPS, DGPS coordinates) of the vehicle 102. In one embodiment, the navigation system 118 may store and access map data (not shown) on the storage unit 116. The map data may pertain to geographical maps and satellite/aerial imagery of one or more locations at which the one or more task requests may be executed and/or fulfilled.

In some embodiments, the application 104 may communicate with the navigation system 118 to determine data associated with the current geo-location of the vehicle 102 and/or data associated with one or more locations within a predetermined distance (e.g., 35 miles) of the vehicle 102. In one configuration, the task assignment application 104 and/or additional components of the system 100 may communicate with the navigation system 118 to analyze the map data to determine distance data, traffic data, environmental data, and point of interest data pertaining to the one or more locations at which the request task may be executed and/or fulfilled. For instance, the map data may be utilized by the navigation system 118 to provide one or more travel distances and/or one or more travel times from one location to another that may be communicated to the application 104.

In one embodiment, the ECU 110 and/or the head unit 112 may be operably connected to a communication unit 120. The communication unit 120 may be capable of providing wired or wireless computer communications utilizing various protocols to send/receive non-transitory signals internally to the plurality of components of the vehicle 102 and/or externally to external devices such as the portable device 106a used by the requestor, the portable device 106b used by the agent(s), and/or the external server 108. Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system.

In one or more embodiments, the communication unit 120 may be utilized to communicate with the portable device 106a used by the requestor and/or the respective portable device 106b used by the agent(s). In some configurations, the application 104 may utilize the communication unit 120 to communicate data pertaining to the task request provided by the requestor. For example, if the requestor provides the task request via the portable device 106a or the connected device(s) 150, the application 104 may utilize the communication unit 120 to communicate data pertaining to the task request from the portable device 106a or the connected device(s) 150 to the ECU 110 and/or the head unit 112 of the vehicle 102.

In additional configurations, the communication unit 120 may be configured to communicate with the portable device 106b used by one or more agents. More specifically, upon creation of the unassigned task that is associated with the task request provided by the requestor, the application 104 may utilize the communication unit 120 to communicate data pertaining to the unassigned task to be presented via the portable device 106b. As discussed below, one or more agents selected by the application 104 may receive the unassigned task through the respective portable device 106b and may selectively accept (e.g., pick-up) the unassigned task. The application 104 may thereby convert the unassigned task into an assigned task that may be assigned to a particular agent that accepts the unassigned task and may present the assigned task through the respective portable device 106b used by the assigned agent.

In some embodiments, the communication unit 120 may additionally be configured to communicate with the external server 108 to send and/or receive data through an internet cloud 122. As discussed below, the external server 108 may host a plurality of databases, engines (e.g., internet/web search engines), and data lists that may be accessed by the application 104 to assign the agent to execute and/or fulfill the task request, the task execution location, and/or the task fulfillment location.

In an exemplary embodiment, the vehicle 102 may include a voice recognition system 124 that may be implemented as a hardware device of the vehicle 102. The voice recognition system 124 may include one or more microphones (not shown) located within the vehicle 102 and hardware configured to receive voice data (e.g., sensed voices within the vehicle 102) provided by the requestor or the agent(s) within the vehicle 102. In some configurations, the voice recognition system 124 may communicate with an associated voice recognition system (not shown) of the portable device 106a used by the requestor and/or an associated voice recognition system (not shown) of the respective portable device 106a used by the agent(s) to respectively receive voice data provided by the requestor and/or the agent(s) via one or more microphones (not shown) of the portable device 106a. In additional configurations, the voice recognition system 124 may communicate with an associated voice recognition system (not shown) of one or more connected devices 150 that are utilized by the requestor and/or the agent(s) to receive voice data provided by the requestor and/or the agent(s) via one or more microphones (not shown) of the connected device(s) 150. For purposes of simplicity, the voice recognition system 124 of the vehicle 102 will be discussed in more detail within this disclosure. However, it is to be appreciated that the disclosure with respect to the functionality of the voice recognition system 124 may also apply to the associated voice recognition system of the portable device 106a, the associated voice recognition system of the portable device 106b, and/or the associated voice recognition of the connected device(s) 150.

In one or more configurations, the voice recognition system 124 may be enabled to analyze voices in the form of voice data that is sensed by the microphone(s). The voice recognition system 124 may be configured to locate human speech patterns upon receiving an activation signal from the application 104. As discussed below, the application 104 may present a task request user interface through the display unit 114, the portable device 106a, and/or the connected device(s) 150 that may include a task request user interface icon that may be inputted by the requestor to provide a spoken task request to the application 104. Upon receipt of the input to the task request user interface icon, the voice recognition system 124 may be enabled to analyze the voice data sensed by the microphone(s).

In an additional embodiment, the voice recognition system 124 may be configured to sense a particular trigger phrase that may be spoken by the requestor within the vehicle 102, through the respective portable device 106a, and/or to one or more connected devices 150. Upon sensing the trigger phrase, the voice recognition system 124 may analyze the voice data sensed by the microphone(s). For example, the phrase "task request" may be used by the application 104 as a trigger phrase to enable the voice recognition system 124 to further analyze the voice data sensed by the microphone(s) to receive a spoken task request that is provided to the application 104.

As discussed below, the application 104 may present an unassigned task user interface (not shown) through the display unit 114 and/or the portable device 106*a* to one or more agents (determined by the application 104). The unassigned task user interface may present one or more request attributes and associated data that may pertain to the execution and facilitation of the task request to allow the one or more agents of the agent pool 146 to accept the unassigned task. Based on the acceptance of the unassigned task via the unassigned task user interface, the application 104 may assign the assigned task to an agent (e.g., one of the agents who have accepted the unassigned task) of the agent pool.

In one embodiment, the unassigned task user interface may include a task response user interface icon (not shown) that may be inputted by one or more of the agents to provide a spoken response to the unassigned task to the application 104. The spoken response may include a statement pertaining to the acceptance of the unassigned task or a statement pertaining to the rejection of the unassigned task. In some configurations, the spoken response may include a phrase or question that may be provided to the application 104 to which a response is provided by the application 104. In one configuration, upon receipt of the input to the task acceptance user interface icon, the voice recognition system 124 may be enabled to analyze the voice data sensed by the microphone(s) within the vehicle 102, of the portable device 106*a*, or of the connected device(s) 150 utilized by the agent(s).

Upon enablement to further analyze the voice data, the voice recognition system 124 may thereby generate a textual or other simple representation of one or more words in the form of the voice input(s) that is provided by the voice recognition system 124 to a command interpreter 126 of the vehicle 102. In some embodiments, the voice recognition system 124 may generate multiple possible words or phrases such as when the voice recognition system 124 may not resolve the spoken word or phrase with 100% certainty. In such embodiments, the voice recognition system 124 may provide possible phrases in the form of voice inputs to the command interpreter 126. In such embodiments, the voice recognition system 124 may also provide a "confidence value" within the voice inputs for each such possible phrase indicating how confident the voice recognition system 124 is that each possible phrase was the actual phrase spoken.

With particular reference to the command interpreter 126, upon receiving data pertaining to the voice input(s) provided by the requestor and communicated by the voice recognition system 124, the command interpreter 126 may analyze the voice input(s) and may perform speech pattern recognition on the voice input(s) to determine one or more statements spoken by the requestor and/or one or more responses and/or inquiries spoken by the agent(s) based on the voice input(s).

In some configurations, the command interpreter 126 may communicate with an associated interpreter (not shown) of the portable device 106*a* used by the requestor, an associated interpreter (not shown) of the portable device 106*b* used by the agent(s) to receive the voice input(s), and/or an associated interpreter of the connected device(s) 150 utilized by the requestor and/or the agent(s). For purposes of simplicity, the command interpreter 126 of the vehicle 102 will be discussed in more detail within this disclosure. However, it is to be appreciated that the disclosure with respect to the functionality of the command interpreter 126 may also apply to the associated interpreter of the portable device 106*a* and/or the portable device 106*b*.

In one configuration, the one or more statements may be recognized as one or more statements made by the requestor (within the vehicle 102, through the portable device 106*a*, and/or to the connected device(s) 150) that may pertain to the spoken task request. As discussed below, the one or more instructions may also be recognized based on the one or more sensor inputs pertaining to one or more unspoken task requests. With respect to the spoken task requests, the command interpreter 126 may utilize multimodal processing and/or machine learning to perform the speech pattern recognition to determine one or more phrases spoken by the requestor that may pertain to providing the spoken task request.

The one or more statements may include one or more inquiries, requests, commands, directions, assertions, and/or details that may be associated with the content of the task request as provided by the requestor. As discussed below, upon determining the one or more statements, the command interpreter 126 may provide the one or more statements to the task assignment application 104. The application 104 may analyze the one or more statements interpreted by the command interpreter 126 to determine one or more request attributes that may be associated with the task request provided by the requestor.

In one embodiment, the connected device(s) 150 may include one or more devices that are configured to wirelessly connect to the internet cloud 122 and communicate with the components of the system 100. The one or more connected device(s) 150 may include a processor 152 for providing processing and computing functions. The processor 152 may be configured to control one or more respective components of the respective connected device(s) 150. The processor 152 may additionally execute one or more applications that include the task assignment application 104.

In one embodiment, the processor 152 may be operably connected to a respective display screen (not shown) of the connected device(s) 150 that may be capable of receiving inputs from the requestor and/or the agent(s) directly or through an associated keyboard/touchpad (not shown). The display screen may be utilized to present one or more application HMIs to provide the requestor and/or the agent(s) with various types of information and/or to receive one or more inputs from the requestor and/or the agent(s). In one embodiment, the application HMIs may pertain to one or more application interfaces, including one or more user interfaces associated with the task assignment application 104.

In one embodiment, the processor 152 may also be operably connected to a plurality of sensors 154 of the connected device(s) 150. The plurality of sensors may include, but may not be limited to, weight sensors, camera sensors, LiDAR sensors, and the like and may be configured to output and communicate the one or more sensor inputs to the task assignment application 104. In one embodiment, the plurality of sensors 154 may be configured to utilize weight logic, image logic, and/or LiDAR logic that is stored in associated memory (not shown) to sense when a requirement associated with the requestor is to be fulfilled (e.g., particular object may need to be replaced) and thereby communicate one or more sensor inputs to the application 104.

As an illustrative example, the camera sensors and weight sensors of the plurality of sensors 154 of a particular connected device 150 configured as a smart refrigerator utilized by the requestor may be configured to determine when the requestor has run out of milk or is about to run out of milk based on the weight of a (almost empty vs full) carton of milk or an image of an interior portion of the smart refrigerator in which the carton of milk is normally stored is no longer stored. The plurality of sensors 154 may thereby communicate one or more respective sensor inputs to the task assignment application 104 that indicate that the requestor has run out of milk and/or is about to run out of milk. The one or more sensor inputs may be analyzed by the task assignment application 104 to determine one or more request attributes associated with a task request.

In one embodiment, the connected device(s) 150 may additionally include a respective storage unit 156. The storage unit 156 may store one or more operating systems, applications, associated operating system data, application data, application user interface data, and the like that are executed by the processor 152 and/or one or more applications including the task assignment application 104. For example, the storage unit 156 may include a profile that is associated with the requestor and/or the agent(s) utilizing the respective connected device(s) 150. The profile may include the requestor/agent(s) name, primary address, secondary/additional addresses, telephone number(s), vehicle information (e.g., VIN), and the like that may be utilized by the application 104 to identify the requestor and/or the agent(s) utilizing the respective connected device(s) 150. In some configurations, the identification of the requestor and/or the agent(s) may take place when the requestor and/or the agent(s) expressly speaks a statement (e.g., request, approval of a task request) to the connected device(s) 150 and/or when sensor input(s) are provided by the plurality of sensors 154 of the connected device(s) 150 that may be analyzed to determine one or more request attributes by the task assignment application 104.

In an exemplary embodiment, the connected device(s) 150 includes a respective communication device 158 that allows the connected device(s) 150 to be wirelessly connected to the internet cloud 122. The communication device 158 may include antennas and components that may be utilized for wired and wireless computer connections and communications via various protocols. The communication device 158 may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication device 158 may provide respective wireless connections (peer-to-peer, Bluetooth®, WAN) with one or more wireless access points to connect the connected device(s) 150 to a Wi-Fi network to exchange communications with one or more external computing environments through the internet cloud 122. In particular, the communication device 158 may be configured to wirelessly communicate with the internet cloud 122 to send and/or receive data packets between the respective connected device(s) 150 and the external server 108. In some configurations, the application 104 may utilize the communications between the connected device(s) 150 and the external server 108 to communicate one or more voice inputs and/or one or more sensor inputs from the connected device(s) 150 to the external server 108 and to provide one or more functions of the application 104.

The communication device 158 may also be utilized to initiate a wireless connection (peer-to-peer, Bluetooth®, WAN) with the communication unit 120 of the vehicle 102 to send and receive electronic signals between one or more of the components of the connected device(s) 150 and the vehicle 102. Additionally, the communication device 158 may also be utilized to initiate a wireless connection with the respective portable devices 106a, 106b to send and receive electronic signals between one or more components of the connected device(s) 150 and one or more components (discussed below) of the respective portable devices 106a, 106b.

In some embodiments, the connected device(s) 150 may include one or more speakers (not shown) that may be operably controlled by the processor 152 to output vocal data to the requestor and/or the agent(s). The vocal data may include one or more vocal statements that are communicated to the requestor and/or the agent(s) in a conversational style based on one or more voice inputs corresponding to one or more statements communicated by the user(s), one or more sensor inputs corresponding to data sensed by one or more of the plurality of the sensors 154 of the connected device(s) 150, and/or communication of task related data by the task assignment application 104 to the processor 152.

As an illustrative example, the task assignment application 104 may operably control the one or more speakers to provide one or more vocal statements to the requestor based on one or more vocal inputs corresponding to the requestor's statement "I would like to purchase milk." Based on the analysis of the voice inputs, the task assignment application 104 may determine one or more request attributes and may communicate with the processor 152 to operably control the one or more speakers to provide a vocal statement in a conversational style stating "I will assign a task to your husband to pick up milk since he is near the store, how does that sound?"

In another illustrative example, the task assignment application 104 may operably control the one or more speakers to provide one or more vocal statements to the requestor that utilizes the connected device 150 (smart refrigerator). The one or more vocal statements may be based on one or more sensor inputs corresponding to weight sensors of the plurality of sensors 154 determining that a carton of milk is running low within the smart refrigerator. Upon analyzing the sensor input(s) and determining one or more request attributes, the task assignment application 104 may communicate with the processor 152 to operably control the one or more speakers to provide a vocal statement "the milk is running low, would you like to have someone pick up some more milk?" In one or more configurations, the task assignment application 104 may be configured to utilize the voice recognition system and the command interpreter of the smart refrigerator to receive further voice input(s) associated with further statements (e.g., responses) that may be communicated by the requestor and/or one or more agents that may utilize the smart refrigerator.

In an exemplary embodiment, the one or more request attributes determined by the task assignment application 104 may include data pertaining to specific statements within the spoken request provided by the requestor of the task request and/or data pertaining to specific instructions that are derived by the sensor input(s) communicated by the plurality of sensors 154 of the connected device(s) 150. In particular, the one or more request attributes may include, but may not be limited to, a content (e.g., the work to be executed and/or fulfilled) of the task request that may be determined based on the voice input(s) associated with statement(s) provided by the requestor and/or the sensor input(s) provided by the plurality of sensors 154 and a category of the task request that may be assigned based on the voice input(s) associated with the statement(s) provided by the requestor and/or the sensor input(s) provided by the plurality of sensors 154.

The one or more request attributes may additionally include, but may not be limited to a specific agent that may be assigned based on the voice input(s) associated with the statement(s) provided by the requestor and/or the sensor input(s) provided by the plurality of sensors 154, a task execution location to execute the task request that may be assigned based on the voice input(s) associated with the statement(s) provided by the requestor and/or the sensor input(s) provided by the plurality of sensors 154, a task fulfillment location to fulfill the task request that may be assigned based on the voice input(s) associated with the statement(s) provided by the requestor and/or the sensor input(s) provided by the plurality of sensors 154, a priority to execute and/or fulfill the task request that may be determined based on the voice input(s) associated with the statement(s) provided by the requestor and/or the sensor input(s) provided by the plurality of sensors 154, a timeframe in which to execute and/or fulfill the task request that may be determined based on the voice input(s) associated with the statement(s) provided by the requestor and/or the sensor input(s) provided by the plurality of sensors 154, and a price range in which to execute and/or fulfill the task request that may be determined based on the voice input(s) associated with the statement(s) provided by the requestor and/or the sensor input(s) provided by the plurality of sensors 154.

As an illustrative example, the command interpreter of the connected device(s) 150 may determine a statement "I need a ride from my home to the airport for my 9 AM flight" that is provided by the requestor utilizing a connected device 150 configured as a personal electronic assistant. The command interpreter 126 may provide the statement to the task assignment application 104 and the application 104 may analyze the statement to determine the one or more request attributes associated with the spoken task request. The task assignment application 104 may determine that the request attributes include a content of the task request as "ride from home to the airport at 9 AM," a category of the task request as "ride service," a task execution location to execute the task request as "home," a task fulfillment location to fulfill the task request as "airport," a priority to execute and fulfill the task request as "high," a timeframe in which to execute the task (e.g., pick up the requestor) as 3 hours before a flight time of 9 AM, and a timeframe in which to fulfill the task (e.g., travel to airport and drop-off the requestor) as thirty minutes.

Additionally, one or more responses and/or inquires may be provided by the agent(s) (within the vehicle 102 occupied by the agent(s), through the portable device 106*b* used by the agent(s), and/or to the connected device(s) 150 utilized by the agent(s)) that may pertain to an unassigned task that is presented to the agent(s) via the unassigned task user interface. In one embodiment, the command interpreter 126 may utilize multimodal processing and/or machine learning to perform the speech pattern recognition to determine one or more responses and/or inquiries that may be spoken by the agent(s) that may pertain to accepting the unassigned task, rejecting the unassigned task, and/or requesting additional information pertaining to the unassigned task.

The one or more response and/or statements may include one or more commands, directions, and/or inquiries that may be spoken by the agent(s) in response to receiving the unassigned task. Upon determining the one or more responses and/or statements, the command interpreter 126 may provide the responses and/or inquiries to the task assignment application 104. The application 104 may analyze the one or more responses and/or inquires interpreted by the command interpreter 126 to determine the acceptance of the unassigned task, the rejection of the unassigned task, or the request for additional information pertaining to the unassigned task that is associated with the task request provided by the requestor.

With reference to the aforementioned illustrative example, the application 104 may send an unassigned task to a particular agent regarding the requestor's task request "ride from home to the airport at 9 AM." Upon receipt of the unassigned task, the particular agent may provide a spoken inquiry "which airline are you flying?" The command interpreter 126 (or the associated command interpreter of the connected device(s) 150 and/or the portable device 106*a*) may provide the inquiry to the task assignment application 104 and the application 104 may analyze the inquiry to determine the one or more request attributes that may apply to answering the inquiry. In some configurations, if the request attribute(s) does not include the answer to the inquiry, the application 104 may additionally send the inquiry to the requestor through the display unit 114 of the vehicle 102 in which the requestor is an occupant, the connected device(s) 150 that is being utilized by the requestor and/or through the portable device 106*a* used by the requestor to allow the requestor to answer the inquiry (verbally or through user interface inputs). Upon the requestor's answer to the inquiry, the application 104 may provide the answer to the particular agent through the display unit 114 of the vehicle 102 in which the agent is an occupant the connected device(s) 150 utilized by the agent, and/or the portable device 106*b* used by the agent.

With particular reference to the external server 108, the server 108 may house one or more databases that may include, but may not be limited to, a task database 128, a preferred agent database 130, and a point of interest database (POI database) 132. As discussed below, the task database 128 may be populated by one or more components of the application 104. Additionally, the preferred agent database 130 and the POI database 132 may be populated by the requestor during the configuration phase of the application 104 through one or more user interfaces. The populating of the databases 130, 132 may allow the requestor to provide customization to the task location determination and task assignment processes executed by the application 104 during an execution phase of the application 104.

In one embodiment, the task assignment application 104 may communicate with the external server 108 to store data pertaining to each task request and the one or more request attributes within the task database 128 hosted on the external server 108. Additionally, the task assignment application 104 may communicate with the external server 108 to store data within the task database 128 pertaining to each unassigned task that may be created based on the processing of the task request. Furthermore, the task assignment application 104 may communicate with the external server 108 to store data within the task database 128 pertaining to each assigned task that may be created based on the assigning of the unassigned task.

In an exemplary embodiment, the task database 128 may include records that are associated with one or more task requests, one or more assigned tasks that are assigned to an agent to be executed and fulfilled, and one or more fulfilled tasks that have been executed and fulfilled. The records may contain data associated with the one or more attributes of the task request as populated by one or more components of the application 104. Additionally, the records may contain data associated with each task request, each assigned task, and/or each fulfilled task pertaining to data provided by the requestor and/or one or more agents.

FIG. 2 is an illustrative example of a subset of fields of the task database 128 according to an exemplary embodiment. In one or more embodiments, the task assignment application 104 may communicate with the external server 108 through the internet cloud 122 to access the task database 128 to populate data associated with the one or more request attributes of each task request received by the application 104. Additionally, the task assignment application 104 may access the task database 128 to retrieve data associated with other task requests, the unassigned tasks, the assigned tasks and/or the fulfilled tasks to determine one or more request attributes, to assign the task execution location and/or the task fulfillment location, and/or to assign the agent to execute and/or fulfill the task.

In one configuration, the task database 128 may include records 204 that each correspond to a respective task category 202. In particular, each of the records that pertain to a respective task may include the status of the task requests and/or tasks (e.g., task request, unassigned, active, fulfilled) that may be included within a status field 206 of the task database 128. As shown in the illustrative example, records associated with one or more task requests such as the task request 210a may be included within the database 128 and may be populated with one or more records that are associated with one or more of the request attributes as provided by the requestor.

Additionally, records associated with one or more unassigned tasks that are created by the application 104 based on the processing of the one or more respective task requests, such as the unassigned tasks 210b, 210c may be populated by the application 104 with information as determined based on the request attributes of the associated task requests. As shown, such information may include an execution time stamp and a fulfillment time stamp that may be provided to one or more agents of the pool of agents as determined by the application 104 to accept or reject the unassigned task. Also, additional information not shown in the illustrative example of FIG. 2) included within the records including, but not limited to, the task execution location, the task fulfillment location, the urgency of the task, and/or a requested price point to execute and/or complete the task may be included within respective categories of the task database 128 and may be associated with the unassigned task.

As shown, records associated with one or more assigned tasks such as the assigned task 210d may be included as the task is assigned to a particular agent as populated by the application 104 within an assigned agent field 208. As discussed, the assigned task may include a task that is currently assigned and may be in the process of being executed and/or fulfilled by the assigned agent. Records associated with one or more fulfilled tasks such as the fulfilled task 210e may also be included within the database 128. These records may include tasks that an assigned agent that is listed within the assigned agent field 208 has already fulfilled. In particular, the one or more fulfilled tasks are tasks that one or more assigned agents may have previously marked as fulfilled.

As shown in FIG. 2, the task database 128 may include additional fields that such as a date stamp field 212 that may include due dates requested and/or assigned to each of the task requests and tasks. Additionally, the task database 128 may include an execution time stamp field 214 that may pertain to a time that each task request is requested to be executed, a time each unassigned or assigned task is to be executed, or a time that each fulfilled task has been executed. For example, with reference to the fulfilled task 210e, the execution time stamp field 214 may include a time that dry cleaning was picked up by the assigned agent Jane Smith. The task database 128 may further include a fulfillment time stamp field 216 that may pertain to a time that each task request is requested to be fulfilled, a time each unassigned or assigned task is to be fulfilled, or a time that each fulfilled task has been fulfilled. For example, with reference to the fulfilled task 210e, the fulfillment time stamp field 216 may include a time that dry cleaning was dropped off to the requestor by the assigned agent Jane Smith.

It is to be appreciated that the task database 128 may include one or more additional fields pertaining to one or more additional request attributes in addition to those shown in the illustrative example of FIG. 2. For example, one or more additional fields pertaining to a requested agent, a requested priority, a requested timeframe to execute and/or fulfill the task, a requested location at which to execute and/or fulfill the task, and/or a requested price point in which to execute and/or fulfill the task may be included within the task database 128 to be accessed by the application 104.

In some embodiments, the task assignment application 104 may communicate with the external server 108 through the internet cloud 122 to access the task database 128 to retrieve data from the records of one or more fields of the task requests pertaining to the respective task category 202, the task execution location (not shown), the task fulfillment location (not shown), the date stamp field 212, the execution time stamp field 214, and/or the fulfillment time stamp field 216 to determine an agent that may execute and fulfill multiple task requests based on a similar category of task request, proximity of task locations pertaining to the multiple task requests, coinciding dates to execute and/or fulfill the task request, and/or similar time stamps in which to execute and/or fulfill the task request.

For example, the application 104 may assign a particular agent to execute and fulfill both of the unassigned tasks 210b, 210c based on the fulfillment time (2:30 PM) for the unassigned task 210b to fulfill the task request of 'airport drop off' and the similar successive execution time (2:45 PM) for the unassigned task 210b to execute the task request of 'airport pickup', as the fulfillment of the unassigned task 210b may occur at a time and location that is similar to the successive time and location of the execution of the unassigned task 210c.

FIG. 3 includes an illustrative example of the preferred agent database 130 according to an exemplary embodiment. In one embodiment, the preferred agent database 130 may be populated by a requestor utilizing the application 104 via a preferred agent user interface (not shown, discussed in more detail below). In some embodiments, the preferred agent database 130 may be auto-populated with particular data that may pertain to one or more fields of the database 130 by the task assignment application 104 based on historical data pertaining to one or more of the fulfilled tasks included within the task database 128.

In an exemplary embodiment, the preferred agent database 130 may be populated with a list of preferred agents included within a preferred agent field 302 that the requestor would like to designate as preferred agents to execute and/or fulfill a particular category of task request. The preferred agents may include family members, friends, individual agents (e.g., individual service providers), groups, and/or third-party vendors (e.g., general businesses such as ride service providers, pizza restaurants, etc.) The preferred agent database 130 may additionally include one or more agent address fields 304 that may include a primary address and possibly one or more additional addresses that the respective preferred agent may reside at, work at, and/or conduct business from. Additionally, the preferred agent database 130 may include an agent type field 306 that may be populated for each of the preferred agents within corresponding records of the agent field 302 of the preferred agent database 130.

As shown, the agent type field 306 may include records with types of agents that may have a personal relationship (e.g., family, friend) to the requestor populating the preferred agent database 130. Additionally, the agent type field 306 may include records with types of agents that may not have a personal relationship to the requestor and may include a third-party agent (e.g., service provider) that is preferred by the requestor. The preferred agent database 130 may additionally include a requestor relationship field. As shown in the illustrative example, the requestor relationship field 308 may include one or more records that pertain to agents that may have a personal relationship with the requestor. In particular, the requestor relationship field 308 may include the type of personal relationship that the agent has with the requestor.

For example, as shown in FIG. 3, the preferred agent records 310a associated with the preferred agent 'Bob Smith' includes the requestor relationship as 'Adult Son' that pertains to the personal relationship between the requestor and the preferred agent as populated within the database 130 by the requestor. As discussed below, the task assignment application 104 may evaluate records of the requestor relationship field 308 to add one or more agents to the agent pool and/or assign an unassigned task associated with the task request to a particular agent of the agent pool.

In one configuration, the preferred agent database 130 may additionally include a same residence field 312. As shown in the illustrative example, the same residence field 312 may include a designation that allows the application 104 to efficiently determine if each of the agents that are designated as having a personal relationship with the requestor reside in the same residence (e.g., at the same home address) as the requestor.

In one embodiment, an agent priority field 314 of the preferred agent database 130 may include records with a priority assigned to each agent the user designates as a preferred agent. The priorities may be associated with each particular agent and a task category included within records of a task category field 316. For example, as shown within the records 310b, 310c associated with the agent XYZ Food Delivery (shown in records 310b) may include a first priority over YYZ Food Delivery (shown in records 310c) as preferred by the requestor. In one or more configurations, the agent priority may be evaluated and may be utilized by the application 104 to assign a particular preferred agent to a particular task request pertaining to a particular task category to execute and fulfill the particular task request.

A task category field 316 of the preferred agent database 130 may include records that may be associated with each preferred agent and may be populated to designate the respective agent as preferred for a particular category of task. The priority and task category may allow the application 104 to determine which of the agents to be assigned as the agent to execute and/or fulfill each type of task request based on the content and/or the category of the task request as determined by the request attributes of the task request.

In some configurations, the preferred agent database 130 may additionally include a task timeframe field 318. The task timeframe field 318 may be populated by the requestor and/or by data communicated to the external server 108 via the internet cloud 122 to provide a timeframe that the particular agent may be assigned a task (by the application 104) to execute and fulfill a particular task request. In some cases, the task timeframe field 318 may be tied to the task category field 316 such that a task that pertains to a certain category may only be assigned to a particular preferred agent within a timeframe that is included within the respective record of the task timeframe field 318. It is to be appreciated that the preferred agent database 130 may include one or more additional fields pertaining to one or more agent related details in addition to those shown in the illustrative example of FIG. 3.

In some circumstances, the task assignment application 104 may evaluate the records of the fields 308-318 to add one or more agents to the agent pool and/or assign an unassigned task to a particular agent of the agent pool based on the content and/or category of the task request, the task execution location, and/or the task fulfillment location. In particular, the application 104 may take into account the content and/or category of the request to determine which of the agents may be utilized to execute and/or complete the task request. The application 104 may also take into account the task execution location and/or the task fulfillment location to determine if an agent with the same residence as the requestor may be more logistically suited to execute and/or fulfill the task request than other agents of the agent pool 146. For example, if the task request includes a request to 'pick up a case of carton of milk to be brought back to the residence of the requestor' based on sensor input(s) provided by the plurality of sensors 154 sensing that a milk carton previously stored is to be replaced, the application 104 may add agents to the agent pool 146 that may include adults and teenagers with a task category of 'any' and may additionally determine agents that reside as the same residence as the requestor as being more logistically suited to execute and/or fulfill the task.

FIG. 4 includes an illustrative example of the POI database 132 according to an exemplary embodiment. As discussed below, the application 104 may access the POI database 132 to add one or more candidate locations to a candidate list 148 that includes a plurality of candidate locations that may be analyzed to assign the task execution location and/or the task fulfillment location. In an exemplary embodiment, the POI database 132 may be populated by the requestor via a POI user interface (not shown, discussed in more detail below). In some embodiments, the preferred agent database 130 may be auto-populated with particular data that may pertain to one or more fields of the database 132 by the task assignment application 104 based on historical data pertaining to one or more of the fulfilled tasks included within the task database 128.

The POI database 132 may be populated by the requestor with one or more preferred points of interest that are included within a POI field 402 of the database 132. As shown, the POI database 132 may include records that indicate one or more points of interest that may be frequently used as task execution and/or task fulfillment locations that are preferred by the requestor. The one or more preferred points of interest included within the records of the POI field 402 may include one or more categories of locations, individual addresses, and/or vendors that may be utilized to facilitate one or more types of task requests.

The one or more preferred points of interest included within the POI field 402 may additionally include one or more subjective points of interest. The subjective point(s) of interest may be associated with one or more locations frequented by the requestor as a task execution location (e.g., pick up point) or a task fulfillment location (e.g., delivery point) associated with the task request.

For instance, the preferred points of interest may include a home address and a workplace address associated with the requestor's home and workplace. The requestor may additionally add one or more additional preferred points of interest to the POI database 132 that may be used by the application 104 when determining the task execution location and/or the task fulfillment location. For example, as shown, the POI database 132 may be populated with records 404a pertaining to a favorite grocery store that the requestor prefers to be utilized when requesting the delivery of groceries.

In certain embodiments, the one of more points of interest listed within the POI field 402 may be used as spoken keywords that may be understood by the command interpreter 126 of the vehicle 102, the command interpreter of the connected device(s) 150, the command interpreter of the portable device 106a, and/or one or more components of the application 104 as part of one or more statements of the task request. For example, the requestor may state a task request "Pick up a large cheese pizza from Al's" to a particular connected device 150 configured as a personal electronic assistant and the application 104 may recognize Al's from corresponding records 404b of the POI database 132 as the pizza restaurant 'Al's Pizza'.

In one or more embodiments, the POI database 132 may additionally include a POI address field 406 that may include records containing one or more addresses pertaining to one or more locations associated to each respective point(s) of interest. Additionally, the POI database 132 may include a category field 408 that may pertain to a category of each of the points of interest that are included within the POI field 402. In one embodiment, the application 104 may evaluate the category field to determine if a particular point of interest included within the POI database 132 is applicable to be utilized as a task execution location and/or a task fulfillment location based on the content and/or the category of the task request as included within the request attributes of the task request.

As shown in FIG. 4, the POI database 132 may additionally include an hours of operation field 410. The hours of operation field 410 may include records that pertain to one or more applicable points of interest that includes timeframes in which the preferred points of interest may be utilized as the task execution location and/or the task fulfillment location upon processing the task request by the application 104. The POI database 132 may further include a category priority field 412 which may be used to prioritize a particular point of interest if multiple preferred points of interest are listed for a particular category.

For example, as shown in FIG. 4, Al's Pizza included at records 404b is listed as having a first priority and Mario's Pizza included at records 404c is listed as having a second priority with respect to the category of pizza restaurants to be utilized as a task execution location to pick up a pizza per a task request provided by the requestor. It is to be appreciated that the POI database 132 may include one or more additional fields pertaining to one or more point of interest related details in addition to those shown in the illustrative example of FIG. 4.

Referring again to FIG. 1A, in an exemplary embodiment, the external server 108 may additionally host and execute a POI agent engine 134. The POI agent engine 134 may be configured to communicate with the task assignment application 104 to provide one or more third-party vendors that may be assigned as an agent, a task execution location, and/or a task fulfillment location by the application 104 when one or more preferred agents or preferred locations are not provided by the requestor requesting the task request (e.g., are not included within the request attributes of the task request).

In particular, the POI agent engine 134 may provide one or more third-party vendors such as one or more commercial service providers and/or one or more locations (e.g., addresses) that may be assigned as the agent to execute or fulfill the task request and/or the location at which the task request may be executed and/or fulfilled. The POI agent engine 134 may be configured to communicate with one or more third-party vendors (e.g., service providers, delivery services, stores, restaurants, places of business) that may or may not be included within the preferred agent database 130 and/or the POI database 132.

In some configurations, the POI agent engine 134 may also automatically receive data by one or more third-party internet services/applications (e.g., user review sites/applications pertaining to shops, restaurants, hotels, ride services, businesses, etc.) pertaining to one or more third-party agents and/or locations. As an illustrative example, the POI agent engine 134 may provide a list of pizza restaurants that may be utilized as a delivery agent to deliver a pizza to the requestor and/or a task execution location to pick up the pizza for delivery to the requestor. The POI agent engine 134 may be used in such a scenario if the requestor has not requested a particular agent or a particular task execution location within the spoken task request and/or the requestor had not populated the preferred agent database 130 with an applicable preferred agent and/or the POI database 132 with an applicable preferred point of interest.

It is contemplated that the task assignment application 104 may additionally utilize the POI agent engine 134 in scenarios in which the requestor is traveling and may be located outside of an area (e.g., in another city far from the requestor's home) in which the requestor may be aware of one or more agents that may execute and/or fulfill a task request and/or one or more locations at which the task request may be executed and/or fulfilled. For example, the application 104 may utilize the POI agent engine 134 to determine one or more ride service providers that may be used to provide ride services to and/or from one location to another within a particular city in which the requestor is traveling and is requesting a ride.

In one embodiment, the external server 108 may also host and execute a pricing engine 136. The pricing engine 136 may be configured to communicate with the task assignment application 104 to provide one or more pricing schemes/ price points that may be applicable to one or more third-party vendors (included within the preferred agent database 130 or provided by the POI agent engine 134) that may be assigned as an agent to execute and fulfill a task request, a task execution location, and/or a task fulfillment location.

In particular, the pricing engine 136 may be configured to communicate with various vendors through the internet cloud 122 to obtain one or more pricing schemes/price points that may pertain to one or more goods and/or services provided by the third-party vendors. The pricing engine 136 may obtain real-time pricing schemes that may be applicable to price points that are charged by vendors at particular timeframes. For example, the pricing engine 136 may obtain one or more price points utilized by one or more ride service providers at one or more timeframes (e.g., evening, weekend, weekday, peak, off-peak).

As discussed below, the task assignment application 104 may utilize the pricing engine 136 to obtain pricing schemes/price points (e.g., travel related fees, service related fees) directed to the execution and/or fulfillment of the task request. In one embodiment, the pricing engine 136 may be configured to communicate with various vendors through the internet cloud 122 to obtain one or more pricing schemes/price points that may pertain to travel costs and service costs associated with providing goods and/or services. The pricing engine 136 may obtain real-time pricing schemes that may be applicable to prices per distances traveled by the various vendors that may pertain to the travel costs and/or service costs.

As discussed below, in some scenarios, the application 104 may determine a distance that may be traveled by one or more agents and may utilize the pricing engine 136 to estimate a travel cost that may be associated with execution and/or fulfillment of the task request by one or more third-party agents of the agent pool 146. In some configurations, the pricing engine 136 may be configured to communicate with fuel stations and/or energy providers to determine one or more energy rates/fuel rates that may be applicable with respect to travel cost incurred by one or more third-party agents.

In an exemplary embodiment, the external server 108 may additionally store the agent pool 146. The agent pool 146 may be included as an application data file that includes a data list that may be accessed, executed, populated, and/or read by the task request assignment application 104. As discussed below, the agent pool 146 may be populated by the application 104 with a plurality of agents that may potentially be utilized to execute and/or fulfill the task request provided by the requestor.

In one embodiment, the external server 108 may additionally store the candidate list 148. The candidate list 148 may be included as an application data file that includes a data list that may also be accessed, executed, populated, and/or read by the task assignment application 104. As discussed below, the task assignment application 104 may add a plurality of candidate locations to the candidate list 148 that may be further evaluated in order to assign the task execution location at which the task request may be executed and/or the task fulfillment location at which the task request may be fulfilled.

With reference to the portable devices 106a, 106b used by the requestor and the agent(s), the portable devices 106a, 106b may be used to provide inputs and receive data to/from the task assignment application 104. In alternate embodiments, stand-alone computing devices (not shown) may also be used by the requestor and/or the agent(s) to provide inputs and receive data to/from the task assignment application 104. The portable devices 106a, 106b may include, but may not be limited to, mobile devices such as mobile phones or smart phones, hand held devices such as tablets, laptops, e-readers, etc. The portable devices 106a, 106b may include respective processors 138a, 138b for providing processing and computing functions. The processors 138a, 138b may be configured to control one or more respective components of the respective portable devices 106a, 106b. The processors 138a, 138b may additionally execute one or more applications including the task assignment application 104.

The portable devices 106a, 106b may also include respective display screens (not shown) that are operably controlled by the respective processors 138a, 138b and may be capable of receiving inputs from the requestor and/or the agent(s) directly or through an associated keyboard/touchpad (not shown). The display screens may be utilized to present one or more application HMIs to provide the requestor and/or the agent(s) with various types of information and/or to receive one or more inputs from the requestor and/or the agent(s). In one embodiment, the application HMIs may pertain to one or more application interfaces, including one or more user interfaces associated with the task assignment application 104.

As discussed below, one or more user interfaces may be presented to the requestor through the display screen of the portable device 106a (or the stand-alone computing device) and/or the display unit 114 of the vehicle 102 during the configuration phase and the execution phase of the application 104. Additionally, one or more user interfaces may be presented to the agent(s) through the display screen of the portable device 106b (or the stand-alone computing device) and/or the display unit 114 of the vehicle 102 during the configuration phase and the execution phase of the application 104.

In one embodiment, the processors 138a, 138b may be operably connected to respective storage units 140a, 140b of the respective portable devices 106a, 106b. The storage units 140a, 140b may store one or more operating systems, applications, associated operating system data, application data, application user interface data, and the like that are executed by the respective processors 138a, 138b and/or one or more applications including the task assignment application 104. For example, the storage unit 134a of the portable device 106a may include a profile that is associated with the requestor using the portable device 106a.

The profile may include the requestor's name, home address, work place address, additional addresses, telephone number, VIN, payment information (e.g., credit card numbers), a respective device identification (serial number, internet protocol address, physical address where the connected device(s) 150 is utilized) of the one or more connected devices 150 utilized by the requestor that may be utilized by the application 104. Additionally, the storage unit 134b of the portable devices 108b may include a profile that is associated with the agent(s). The profile may include the agent's name, home address, business address, additional addresses, hours of operation, price data associated with fees (e.g., travel fees, service fees), a respective device identification (serial number, internet protocol address, physical address where the connected device(s) 150 is utilized) of the one or more connected devices 150 utilized by the agent(s), and the like that may be utilized by the application 104.

In one embodiment, the storage units 140a, 140b may additionally store map data that may be accessed by location sensors 142a, 142b of the respective portable devices 106a, 106b. The map data may be accessed by the location sensors 142a, 142b to determine directional data, distance data, environmental data, and point of interest data pertaining to one or more locations at which the respective portable devices 106a, 106b and consequently the requestor and the agent(s) using the respective portable devices 106a, 106b may be located.

The map data may include data that pertains to geographical maps and satellite/aerial imagery of one or more locations at which the respective portable devices 106a, 106b are located. As discussed below, in some circumstances, the task assignment application 104 may communicate with the location sensors 136a to determine a current location of the portable device 106a and the requestor that may be used as the task execution location to execute the task (e.g., requestor pickup location) or the task fulfillment location to fulfill the task (e.g., package drop off location).

In some configurations, the task assignment application 104 may communicate with the location sensors 136b to determine a current location of the one or more agents to determine if one of the one or more agents is located at a location that allows the task to be fulfilled within a particular timeframe. This determination may be used to assign a particular agent to execute and fulfill the task request requested by the requestor and/or the connected device(s) 150 utilized by the requestor.

In one configuration, the task assignment application may communicate with the location sensors 136b to determine that a current location of an agent (e.g., a person who has a personal relationship with the requestor) who lives with the requestor to thereby assign the particular agent to execute and fulfill the task request requested by the requestor and/or the connected device(s) 150 utilized by the requestor. In some embodiments, the current location of the portable device 106b used by an assigned agent (assigned to execute and/or fulfill a task request) may be used to provide live updates to the requestor and/or the connected device(s) 150 of the task request. The live updates may pertain to an estimated real-time location of the agent assigned to execute and/or fulfill the task as the agent is in the process of executing and/or fulfilling the task.

In an exemplary embodiment, the processors 138a, 138b may additionally be operably connected to respective communication devices 144a, 144b of the respective portable devices 106a, 106b. The communication devices 144a, 144b may include antennas and components that may be utilized for wired and wireless computer connections and communications via various protocols. The communication devices 144a, 144b may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication devices 144a, 144b may provide respective wireless connections (peer-to-peer, Bluetooth®, WAN) with one or more wireless access points to connect the portable devices 106a, 106b to a Wi-Fi network to exchange communications with one or more external computing environments through the internet cloud 122. In particular, the communication devices 144a, 144b may be configured to wirelessly communicate with the internet cloud 122 to send and/or receive data packets between the respective portable devices 106a, 106b and the external server 108.

As discussed below, the application 104 may utilize the communications between the portable devices 106a, 106b and the external server 108 to provide one or more functions of the application 104. The communication devices 144a, 144b may also be utilized to initiate a wireless connection (peer-to-peer, Bluetooth®, WAN) with the communication unit 120 of the vehicle 102 to send and receive electronic signals between one or more of the components of the respective portable devices 106a, 106b and one or more components of the vehicle 102. The communication devices 144a, 144b may also be utilized to initiate a wireless connection (peer-to-peer, Bluetooth®, WAN) with the communication device 158 of the connected device(s) 150 to send and receive electronic signals between one or more of the components of the respective portable devices 106a, 106b and one or more components of the connected device(s) 150.

II. THE TASK REQUEST ASSIGNMENT APPLICATION AND RELATED METHODS

The components of the task assignment application 104 will now be described according to an exemplary embodiment and with reference to FIG. 1B, a schematic view of an exemplary embodiment of a task request processing application according to an exemplary embodiment. In an exemplary embodiment, the task assignment application 104 may be stored on the storage unit 116 of the vehicle 102, the storage unit 140a of the portable device 106a, the storage unit 140b of the portable device 104b, and/or the storage unit 156 of the connected device(s) 150. In additional embodiments, the task assignment application 104 may be stored on the memory of the external server 108 and may be accessed by the communication unit 120 to be executed by the ECU 110 and/or the head unit 112. Additionally, the application 104 may be accessed by the communication devices 144a, 144b of each of the respective portable devices 106a, 106b to be executed by the respective processors 138a, 138b.

In an exemplary embodiment, the configuration phase of the application 104 may be automatically executed during an initial execution of the application 104. In some configurations, the configuration phase may be manually executed based on an input of a configuration phase execution user interface icon that may be presented on a task request start screen user interface that may be presented via the display unit 114, the display screen of the portable device 106a, and/or a display screen of the portable device 106b. During the configuration phase of the application 104, one or more configuration user interfaces may be presented to the requestor of the application 104.

In particular, during the configuration phase of the application 104, the requestor may be provided with a profile setup user interface (not shown) that allows the requestor to create a profile that may be used by the application 104 (during the execution phase of the application 104) to identify the requestor of the task request and/or identify one or more connected devices(s) 150 that may be utilized by the requestor to provide a task request (based on vocal input(s) and/or sensor input(s)). The requestor profile setup user interface may include one or more fields that allow the requestor to add profile information that may include, but may not be limited to, a username/password login, the requestor's name, home address, work place address, additional addresses, telephone number, VIN, payment information (e.g., credit card numbers), a respective device identification (serial number, internet protocol address, physical address where the connected device(s) 150 is utilized) of the one or more connected devices 150 utilized by the requestor, and the like that may be utilized by the application 104 upon identifying the requestor based on by statement(s) and/or data provided by the connected device(s) 150 utilized by the requestor associated with one or more vocal inputs and/or one or more sensor inputs (that may apply to sensed data sensed by the plurality of sensors 154 of the connected device(s) 150.

The request profile setup user interface may also include one or more fields that allow the requestor to add one or more potential agents (e.g., family members) that have a personal relationship to the requestor. In one embodiment, the requestor may add the names of the individual(s) that may have the personal relationship with the requestor and may link the portable device 106*b*, the connected device(s) 150, and/or the vehicle 102 being used by the individual(s) to access the application 104. The application 104 may thereby present an agent profile setup user interface that may include one or more fields that allow the agent(s) (with the personal relationship to the requestor) to add profile information that may include, but may not be limited to, the potential agent's name, home address, work place address, additional addresses, type of relationship to the requestor, a respective device identification (serial number, internet protocol address, physical address where the connected device(s) 150 is utilized) of the one or more connected devices 150 utilized by the agent(s), and/or one or more task categories that the potential agent may be utilized to execute and/or fulfill.

In one or more embodiments, upon the creation of the profile by the agent(s), the task assignment application 104 may auto-populate the preferred agent database 130 with records associated with each of the individual(s) that may have the personal relationship with the requestor within one or more of the fields of the database 130. In some configurations, if information is not provided by the agent(s) with respect to one or more of the fields of the preferred agent database 130, the application 104 may present the requestor with the preferred agent user interface that may include one or more user input boxes (e.g., text input boxes, menu drop down boxes, menu selection boxes) that are associated to each of the fields of the preferred agent database 130 that may be updated by the requestor for the respective agent(s).

In one or more embodiments, within the configuration phase, upon creation of the profile associated with the requestor, the application 104 may present the requestor with a setup user interface (not shown) that includes a preferred agent user interface input icon and a POI user interface input icon. The preferred agent user interface input icon may be inputted by the requestor to provide inputs via the preferred agent user interface to manually populate the preferred agent database 130 hosted on the external server 108. As discussed above, the preferred agent user interface may include one or more user input boxes that are associated to each of the fields of the preferred agent database 130.

The requestor may update one or more user interface boxes to create/populate records on the preferred agent database 130. The one or more user interface boxes may be associated with one or more fields of the preferred agent database 130 that may include, but may not be limited to, the name of each preferred agent, the address of each preferred agent, the agent type associated with each preferred agent (e.g., family, son, friend, third-party), the requestor relationship with each preferred agent, same residence information pertaining to each preferred agent, the agent priority associated with each preferred agent, the task timeframe associated with each preferred agent (e.g., timeframe in which the requestor would like to have the preferred agent assigned), and one or more task categories that the requestor would like each preferred agent to execute and fulfill.

It is to be appreciated that the preferred agent user interface may include one or more additional user interface boxes that may be used to add additional data to additional contemplated fields of the preferred agent database 130. Updating of the preferred agent user interface thereby allows the requestor to input one or more preferred agents that the requestor would like the application 104 to analyze to be possibly added to the agent pool 146 (for particular task requests) and/or assigned as the agent to execute and/or fulfill the task request, when a specific agent is not specified within the task request.

In one embodiment, the POI user interface input icon may be inputted by the requestor to provide inputs via POI user interface to manually populate the POI database 132 hosted on the external server 108. In one embodiment, the POI user interface may include one or more user input boxes (e.g., text input boxes, menu drop down boxes, menu selection boxes) that are associated to each of the fields of the POI database 132, discussed above.

The requestor may update one or more user interface boxes to create/populate records on the POI database 132. The one or more user interface boxes may be associated with one or more fields of the POI database 132 that may include, but may not be limited to, the name of each point of interest, the address of each point of interest, the category associated with each point of interest (e.g., home, grocery store, post office), the hours of operation (if applicable) that are associated with each point of interest, and one or more point of interest category priorities that the requestor would like the application 104 to use when assigning the task execution location and/or the task fulfillment location for each task request.

It is to be appreciated that the POI user interface may include one or more additional user interface boxes that may be used to add additional data to additional contemplated fields of the POI database 132. Updating of the POI user interface thereby allows the requestor to input one or more points of interest that the requestor may like the application 104 to possibly add as a candidate location (for particular task requests) and/or assign as the task execution location and/or the task fulfillment location when the task execution location and/or the task fulfillment location are not specified within the task request.

Upon creation of the profile associated with the requestors, the agents, the manual update of the preferred agent database 130 through the preferred agent user interface, and/or the manual update of the POI database 132 through the POI user interface, the task assignment application 104 may be put into the execution phase in order to intake task requests that are provided by the requestor and to assign tasks associated to each of the task requests to an agent, as assigned by the application 104.

In one or more embodiments, the task assignment application 104 may include a plurality of modules that may be utilized to process task requests provided by the requestors and assign tasks associated to each of the task requests during the execution phase of the application 104. The plurality of modules may include, but may not be limited to, a request determinant module 160, an agent pool determinant module 162, a candidate location determinant module 164, a task location assignment module 166, and a task assignment module 168, discussed in more detail below. It is to be appreciated that the task assignment application 104 may include additional modules and/or sub-modules that are configured to execute one or more functions of the application 104.

In an exemplary embodiment, the request determinant module 160 of the task assignment application 104 may be configured to communicate with the external server 108 to access the task database 128. Upon accessing the task database 128, the request determinant module 160 may create records associated with each task request provided by the requestor. As discussed below, the records may be populated with data pertaining to the content of the task request and associated with one or more fields that pertain to one or more of the request attributes of the task request as provided by the designated requestor.

Figure 5:
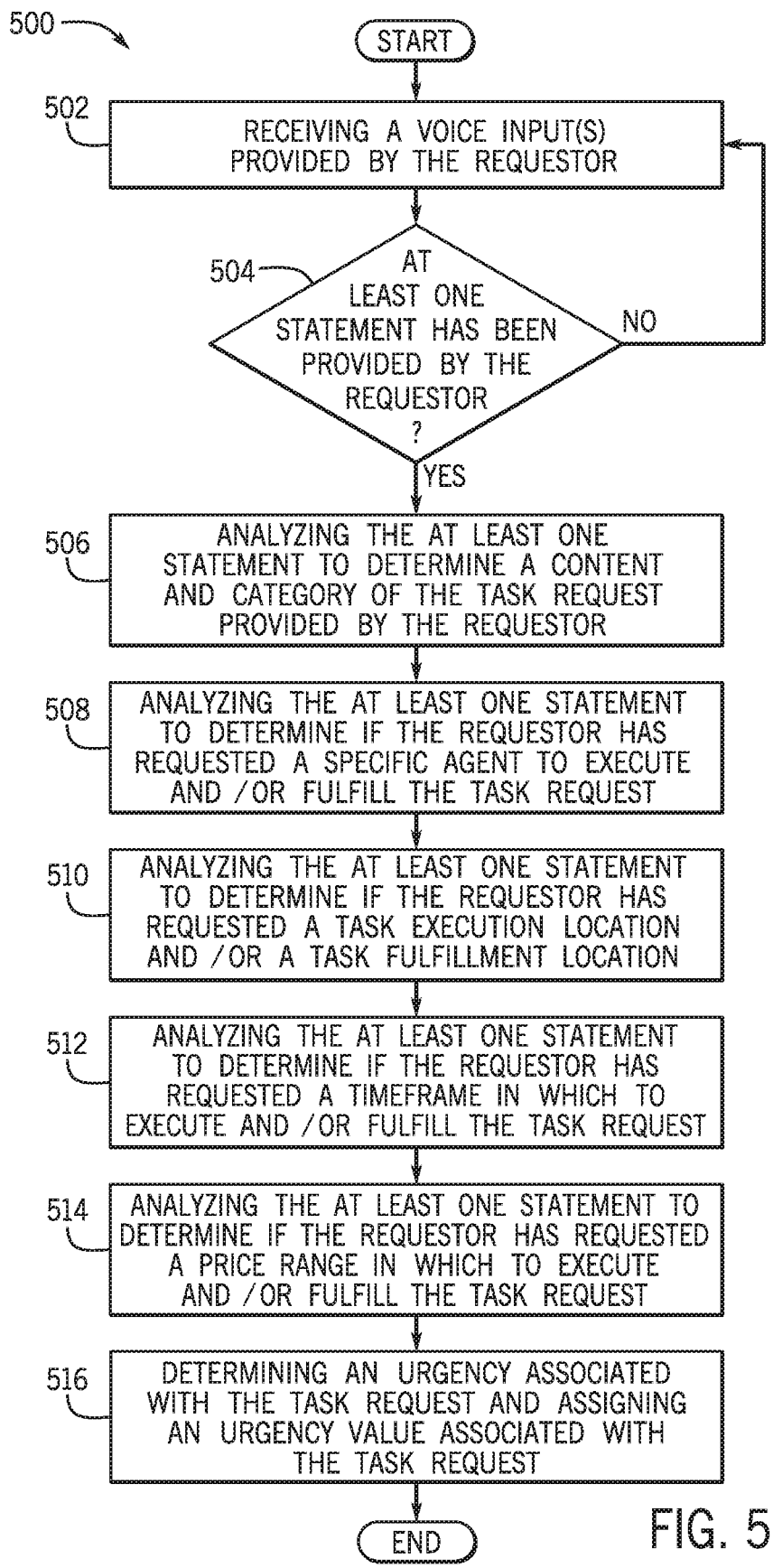
FIG. 5 is a process flow diagram of a method for determining one or more request attributes associated with a task request according to an exemplary embodiment.

FIG. 5 is a process flow diagram of a method 500 for determining one or more request attributes associated with the task request according to an exemplary embodiment. FIG. 5 will be described with reference to the components of FIG. 1A and FIG. 1B, though it is to be appreciated that the method 500 of FIG. 5 may be used with other systems/ components. The method 500 may begin at block 502, wherein the method 500 may include receiving a voice input(s) provided by the requestor. In an exemplary embodiment, the voice recognition system 124 may be enabled to analyze the voice data sensed by the microphone(s) to locate human speech patterns upon receiving an activation signal from the application 104.

As discussed above, the application 104 may present a task request user interface icon that may be inputted by one of the one or more users of the application 104 to provide a spoken task request to the application 104. In an additional embodiment, the voice recognition system 124 may be configured to sense the trigger phrase that may be spoken by the requestor. Upon receipt of the input to the task request user interface icon or upon sensing the trigger phrase being spoken, the voice recognition system 124 may be enabled to analyze voice data sensed by the microphone(s).

In some circumstances, the voice recognition system 124, the voice recognition system of the connected device(s) 150, and/or the voice recognition system of the portable device 106a may be configured to sense the trigger phrase that may be spoken by one of the one or more users of the application 104. In one embodiment, upon receipt of the input to the task request user interface icon or upon sensing the trigger phrase being spoken, the voice recognition system 124 may be enabled to analyze voice data sensed by the microphone(s). The voice recognition system 124 may be configured to continue to receive one or more voice inputs through the microphone(s) and may determine a textual or other simple representation of one or more words in the form of the voice input(s).

In an alternate embodiment, if the plurality of sensors 154 of the connected device(s) 150 utilized by the requestor determine that a requirement is to be fulfilled (e.g., milk is needed), the connected device(s) 150 may vocally (in a conversational style) confirm with the requestor to determine if the requestor would like to request a respective task (e.g., to have milk picked up). In one embodiment, if the requestor provides an affirmative response, the voice recognition system 124 may be enabled to analyze voice data sensed by the microphone(s). The voice recognition system 124 may be configured to continue to receive one or more voice inputs through the microphone(s) and may determine a textual or other simple representation of one or more words in the form of the voice input(s).

The method 500 may proceed to block 504, wherein the method 500 may include determining if at least one statement has been provided by the requestor. In one embodiment, upon receiving the voice input(s), the voice recognition system 124 may communicate respective data pertaining to the voice input(s) to the command interpreter 126 of the vehicle 102. Upon receiving data pertaining to the voice input(s) provided by the voice recognition system 124, the command interpreter 126 may analyze the voice input(s) to determine one or more statements based on the voice input(s). In one or more embodiments, the one or more statements made by the requestor (within the vehicle 102, to the connected device(s) 150 and/or through the portable device 106a) may pertain to the spoken task request. In particular, the command interpreter 126 may utilize multimodal processing and/or machine learning to determine one or more phrases spoken by the requestor that may pertain to providing the spoken task request.

If it is determined that at least one statement has been provided by the requestor (at block 504), the method 500 may proceed to block 506, wherein the method 500 may include analyzing the at least one statement to determine a content and category of the task request provided by the requestor. In one embodiment, upon receiving data pertaining to the voice input(s) provided by the voice recognition system 124, the command interpreter 126 may analyze the voice input(s) to determine one or more of the statements based on the voice input(s). In particular, the command interpreter 126 may utilize multimodal processing and/or machine learning to determine one or more phrases spoken by the requestor that may pertain to a spoken task request. The one or more statements may include one or more inquiries, requests, commands, directions, assertions, and/or details that may be provided by the requestor.

In an exemplary embodiment, the command interpreter 126 may provide data associated with the one or more statements to the request determinant module 160. The request determinant module 160 may analyze the data associated with the one or more statements to determine the content of the task request provided by the requestor. More specifically, the content of the task request may pertain to the type of task (e.g., work) that is being requested by the requestor.

In one configuration, the request determinant module 160 may execute a task request logic (not shown) that is executed by the external server 108. The task request logic may be programmed with one or more stored key words (that may be stored on the memory of the external server 108) that may pertain to one or more types of commonly utilized tasks. In particular, the module 160 may execute the task request logic to determine any commonly utilized tasks that may include words and/or phrases that may correspond to the type of task requested by the requestor.

In additional embodiments, the request determinant module 160 may access the task database to analyze records associated with one or more unassigned tasks, assigned tasks, and/or fulfilled tasks. Such records may contain certain task descriptions that were previously requested and that may be used to determine the content and/or the category of the current task request. In one or more embodiments, the request determinant module 160 may additionally determine the category of the task request based on the determined content of the task request. In particular, the request determinant module 160 may execute the task request logic to determine a category that may pertain to the content of the task request.

As an illustrative example, if the requestor requests to "please pick up groceries per the attached grocery list", the request determinant module 160 may determine the content of the task request as "picking up of groceries per an attached list" and may further determine that the category that pertains to the content is 'Pickup and Delivery'. In one configuration, upon determining the content and the category of the task request, the request determinant module 160 may access the task database 128 and may update the records pertaining to the task request with the content and the category of the task.

In an alternate embodiment, if the plurality of sensors 154 of the connected device(s) 150 determine that a requirement is to be fulfilled, the request determinant module 160 may additionally be configured to analyze and determine the content/category and one or more request attributes of the task request by analyzing the sensor input(s) provided by the plurality of sensors 154 of the connected device(s) 150. In particular, the request determinant module 160 may be configured to determine the content/category and one or more request attributes of the task request by analyzing specific values and categorization (e.g., weight of milk carton) of each of the sensor input(s) and converting the sensor input(s) into the one or more request attributes that may be further analyzed by the application 104 to process the task request provided by the designated requestor.

The method 500 may proceed to block 508, wherein the method 500 may include analyzing the at least one statement to determine if the requestor has requested a specific agent to execute and/or fulfill the task request. In one embodiment, the request determinant module 160 may communicate with the command interpreter 126 to provide speech pattern recognition with respect to the one or more statements determined to be provided by the requestor.

The speech pattern recognition may be utilized to determine if the requester requested (e.g., explicitly stated or implied) a specific agent that the requestor would like the task request to be handled by. In some configurations, the request determinant module 160 may also execute the task request logic to utilize one or more stored common names and/or stored common phrases that may pertain to one or more types of common names, relationships, and/or vendor types that may apply to one or more agents. The task request logic may provide a match to a name or a phrase (e.g., Bob, Dad, Mom, Son, Daughter) that may be applied to determine the specific agent requested by the requestor.

In an additional embodiment, the request determinant module 160 may access the task database 128 to analyze records associated with one or more assigned tasks and/or fulfilled tasks that may contain agent names that were previously assigned tasks. Such records may contain names that may match with one or more names or phrases spoken by the requestor pertaining to a specifically requested agent. In an alternate embodiment, if the requestor is determined to be a pre-programmed user, the request determinant module 160 may access the preferred agent database 130 to analyze the one or more agent names populated by the requestor during the configuration phase of the application 104.

In particular, the request determinant module 160 may analyze one or more records pertaining to the preferred agents that may apply to one or more matching names or phrases spoken by the requestor. In one or more embodiments, if the request determinant module 160 determines that the requestor has requested a specific agent, the request determinant module 160 may access the task database 128 and may update the records pertaining to the task request with the agent requested for the task request.

The method 500 may proceed to block 510, wherein the method 500 may include analyzing the at least one statement to determine if the requestor has requested a task execution location and/or a task fulfillment location. In one embodiment, the request determinant module 160 may communicate with the command interpreter 126 to provide speech pattern recognition with respect to the one or more statements determined to be provided by the requestor. The speech pattern recognition may be utilized to determine if the requester requested (e.g., explicitly stated or implied) a specific location that is to be utilized as a task execution location and/or a specific location that is to be utilized as a task fulfillment location.

In some configurations, the request determinant module 160 may also execute the task request logic to utilize one or more stored common names and/or common phrases that may pertain to one or more types of common location names and/or vendor types that may apply to one or more locations. The task request logic may provide a match to a name or a phrase (e.g., Airport, Grocery Store, Home) that may be applied to determine a requested task execution location and/or a requested task fulfillment location.

In an additional embodiment, the request determinant module 160 may access the task database 128 to analyze records associated with one or more unassigned tasks, assigned tasks, and/or fulfilled tasks that may contain task execution locations and task fulfillment locations that were previously utilized with respect to unassigned, assigned, and fulfilled tasks and that may apply to one or more matching names or phrases spoken by the requestor.

As an illustrative example, if the requestor provides a task request which includes the statement "I need a ride from my house to go to the airport," the request determinant module 160 may determine the task execution location as "home" and may utilize the user's home address (e.g., stored in the user's profile) as a task execution location address. Additionally, the request determinant module 160 may determine the task fulfillment location as "airport" and may utilize the navigation system 118 of the vehicle 102 and/or the POI database 132 to determine the airport address as the task fulfillment location address.

In an exemplary embodiment, if the request determinant module 160 determines that the requestor has requested the task execution location and/or the task fulfillment location, the request determinant module 160 may access the task database 128 and may update the records pertaining to the task request with the task execution location and/or the task fulfillment location requested within the task request.

The method 500 may proceed to block 512, wherein the method 500 may include analyzing the at least one statement to determine if the requestor has requested a timeframe in which to execute and/or fulfill the task request. In one embodiment, the request determinant module 160 may communicate with the command interpreter 126 to provide speech pattern recognition with respect to the one or more statements determined to be provided by the requestor. The speech pattern recognition may be utilized to determine if the requestor requested (e.g., explicitly or implicitly) a timeframe in which to execute the task request at the task execution location and/or to fulfill the task request at the task fulfillment location.

In some configurations, the request determinant module 160 may also execute the task request logic to utilize one or more stored common names and/or common phrases that may pertain to one or more instances of time and/or timeframes. The task request logic may provide a match to a name or a phrase (e.g., sunrise, dinner time, tonight, evening, tomorrow) that may be applied to determine a timeframe(s) that may be associated with the execution of the task and/or the fulfillment of the task.

In an additional embodiment, the request determinant module 160 may access the task database 128 to analyze records associated with one or more unassigned tasks, assigned tasks, and/or fulfilled tasks that may contain timeframes to execute the task and/or timeframes to fulfill the task that were previously utilized within the one or more unassigned, assigned, and fulfilled tasks that may apply to one or more matching names or phrases spoken by the requestor.

As an illustrative example, if the requestor provides a task request which includes the statement "I need a ride from home to go to the airport for my 9 AM flight tomorrow," the request determinant module 160 may determine the task execution timeframe as a pickup time during a following morning that may occur three hours ahead of the 9 AM flight time. Additionally the request determinant module 160 may determine the task fulfillment timeframe as a drop off time during the following morning that may occur two hours ahead of the 9 AM flight time. In an exemplary embodiment, if the request determinant module 160 determines that the requestor has requested the timeframe in which to execute the task request and/or facilitate the task request, the request determinant module 160 may access the task database 128 and may update the records pertaining to the task request with the requested task execution timeframe and/or requested task fulfillment timeframe.

The method 500 may proceed to block 514, wherein the method 500 may include analyzing the at least one statement to determine if the requestor has requested a price range in which to execute and/or fulfill the task request. In one embodiment, the request determinant module 160 may communicate with the command interpreter 126 to provide speech pattern recognition with respect to the one or more statements provided by the requestor.

The speech pattern recognition may be utilized to determine if the requester requested (e.g., explicitly or implicitly) a price range in which to execute and fulfill the task request. The price range may include one or more requested price points that the requestor may state within the spoken task request in which the requestor would like the task request to be executed and fulfilled. For example, the requestor may request "a ride to the airport for under twenty dollars." The request determinant module 160 may analyze the statement "for under twenty dollars" and may thereby determine the preferred price range in which to execute the task request as 'up to twenty dollars.'

In some configurations, the request determinant module 160 may also execute the task request logic to utilize one or more stored common names and/or common phrases that may pertain to one or more price points, price suggestions, price ranges, and/or budgets. The task request logic may provide a match to a name or a phrase (e.g., for about thirty bucks) that may be applied to determine a preferred price range in which to execute and/or fulfill the task request.

In an additional embodiment, the request determinant module 160 may access the task database 128 to analyze records associated with one or more unassigned tasks, assigned tasks, and/or fulfilled tasks that may contain preferred price ranges to execute and/or fulfill the task that were previously utilized within unassigned, assigned, and fulfilled tasks and that may apply to one or more matching names or phrases spoken by the requestor. In an exemplary embodiment, if the request determinant module 160 determines that the requestor has requested the preferred price range in which to execute and fulfill the task request, the request determinant module 160 may access the task database 128 and may update the records pertaining to the task request with the preferred price range requested within the task request.

The method 500 may proceed to block 516, wherein the method 500 may include determining an urgency associated with the task request and assigning an urgency value associated with the task request. In an exemplary embodiment, the request determinant module 160 may analyze the at least one statement to determine if the requestor has requested a particular urgency with which the task request is to be executed and/or fulfilled. In one configuration, the request determinant module 160 may communicate with the command interpreter 126 to provide speech pattern recognition with respect to the one or more statements determined to be provided by the requestor.

The speech pattern recognition may be utilized to determine if the requester implicitly (e.g., based on details) or explicitly requested a particular urgency (e.g., priority) that is to be associated with the task request. In some configurations, the request determinant module 160 may also execute the task request logic to utilize one or more stored common phrases that may pertain to one or more implicit or explicit statements that may apply to an urgency of the spoken task request.

As an illustrative example, if the requestor requests "the package must be delivered ASAP," the request determinant module 160 may determine that the requestor is requesting a high urgency to execute and fulfill the task request. Therefore, the request determinant module 160 may determine a high urgency to the task request.

In one or more additional embodiments, the request determinant module 160 may communicate with the external server 108 to access the task database 128 and may analyze records associated with one or more unassigned tasks and assigned tasks to determine the urgency that is to be associated with the task request. In particular, the one or more records may be analyzed with respect to the urgency assigned to the one or more unassigned tasks and assigned tasks to determine if an urgency to execute and/or fulfill the current task request may be influenced by the urgency of additional unassigned task(s) and assigned task(s). In other words, the urgency of one or more unassigned tasks and one or more assigned tasks that are associated to task requests provided by the requestor may influence the determination of the urgency of the current task request.

In one configuration, in circumstances in which the requestor does not explicitly request the urgency of the task request, the request determinant module 160 may determine an urgency based on a requested timeframe of the task request if one is provided to ensure that the urgency is assigned based on the requestor's wishes. For example, the request determinant module 160 may evaluate the request attributes and may determine the urgency of the task request based on the timeframe in which the requestor has requested the task request be executed and/or fulfilled.

In some embodiments, in circumstances in which the requestor does not explicitly request the urgency of the task request but does request a timeframe to execute and/or complete the task, a specified agent, a specified task execution location, and/or a specified task fulfillment location, the request determinant module 160 may determine the urgency based on travel paths, traffic patterns, and/or one or more additional request attributes. In particular, when applicable, the request determinant module 160 may determine the location (e.g., real-time location or fixed location) of the specified agent based on communication with the location sensors 142*b* of the portable device 106*b* used by the specified agent and/or the navigation system 118 of the vehicle 102 occupied by the specified agent(s). Additionally, the request determinant module 160 may determine the specific location (e.g., address) of the task execution location and/or the task fulfillment location (from the POI database 132 or the POI agent engine 134) to determine the travel path between the specified agent and the task execution location and between the task execution location and the task fulfillment location.

The request determinant module 160 may further determine an expected timeframe that may be utilized to execute and/or fulfill the task request based on real-time traffic patterns provided by the navigation system 118 of the vehicle 102 that may apply to the travel paths. The module 160 may compare the expected timeframe to the requested timeframe to execute and/or fulfill the task request to determine a window of time in which the agent may execute and/or fulfill the task. The request determine module 160 may further evaluate the window of time to determine the urgency associated with the task request.

As an illustrative example, if the requestor has asked that a package be picked up from a specific location and delivered to the requestor within a two hour timeframe by a specific agent, the request determinant module 160 may determine the request attributes associated with the task request (e.g., specific agent, timeframe, task execution location, and task fulfillment location) and may communicate with the location sensors 142a, 142b and/or the navigation system 118 to determine an expected timeframe that may be utilized to execute and fulfill the task request based on real-time traffic patterns.

The request determinant module 160 may determine an urgency (e.g., high, medium, low) associated with the task request based on a window of time (e.g., One Hour Thirty Minutes: one hour travel time for the specified agent to reach the task execution location and thirty minutes of travel time to travel from the task execution location to the task fulfillment location) that may be utilized by the agent to execute and fulfill the task request. The window of time may be based on the requested timeframe and an expected timeframe to execute and fulfill the task request that is based on the real-time traffic patterns.

In an exemplary embodiment, upon determining the urgency of the task request, the request determinant module 160 may assign an urgency value (e.g., numerical value, percentage) that may indicate the determined urgency that is associated with the task request. The urgency value may be included as part of a scale (e.g., 1-5 scale, Low to High scale) that allows the application 104 to accordingly assign the task execution location, the task fulfillment location, and/or the agent to execute and fulfill the task.

As discussed below, in circumstances that the requestor has not requested a task execution location and/or a task fulfillment location, the application 104 may compare the urgency value against one or more threshold values to assign the task execution location and/or the task fulfillment location from the plurality of candidate locations. Additionally, in circumstances that the requestor has not requested a specified agent, the application 104 may compare the urgency value against one or more threshold values to select one or more agents from the agent pool 146 to potentially be assigned to the task request. In one embodiment, upon assigning the urgency value associated with the task request, the request determinant module 160 may access the task database 128 and may update the records pertaining to the task request with the urgency value as assigned by the module 160.

Figure 1B:
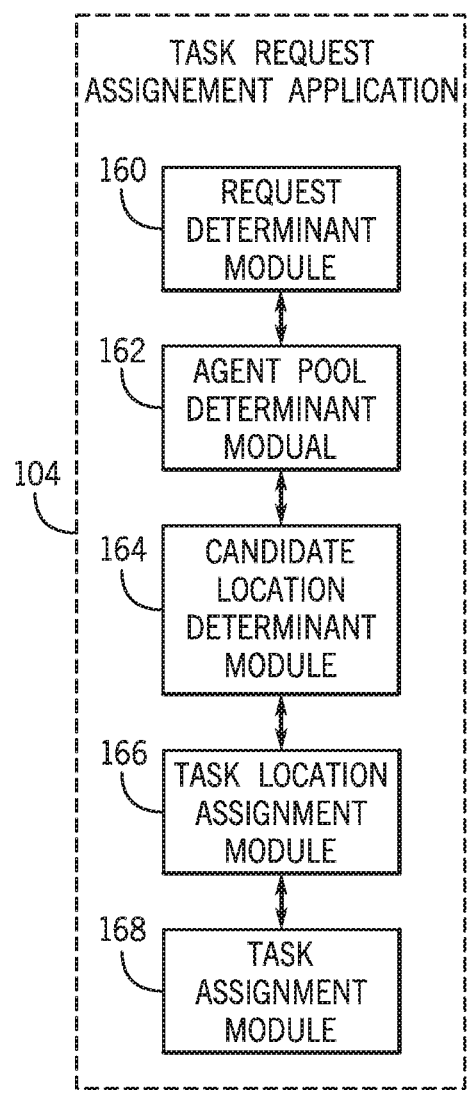
FIG. 1B is a schematic view of an exemplary embodiment of a task request processing application according to an exemplary embodiment of the present disclosure.

With continued reference to FIG. 1A and FIG. 1B, upon determining the content, category, and one or more additional request attributes of the task request provided by the requestor, and assigning the urgency value associated with the task request, the request determinant module 160 may communicate respective data to the agent pool determinant module 162, the candidate location determinant module 164, the task location assignment module 166, and the task assignment module 168. As discussed below, the modules 162, 164, 166, 168 may evaluate the data pertaining to the content, category, one or more request attributes of the task request, and/or the urgency value associated with the task request to further process the task request and assign a task associated with the task request.

With particular reference to the agent pool determinant module 162, the module 162 may determine the agent pool to execute and/or fulfill the task request based on at least one request attribute of the task request as determined by the request determinant module 160. As discussed above, the agent pool may include a list of potential agents that may be evaluated for selection to possibly execute and/fulfill the assigned task that is associated with the task request. In one embodiment, the agent pool determinant module 162 may add one or more agents to the agent pool 146 (e.g., data associated with names and associated information pertaining to one or more agents) that may be further evaluated in order to assign a particular agent to execute and/or fulfill the task request.

Figure 6:
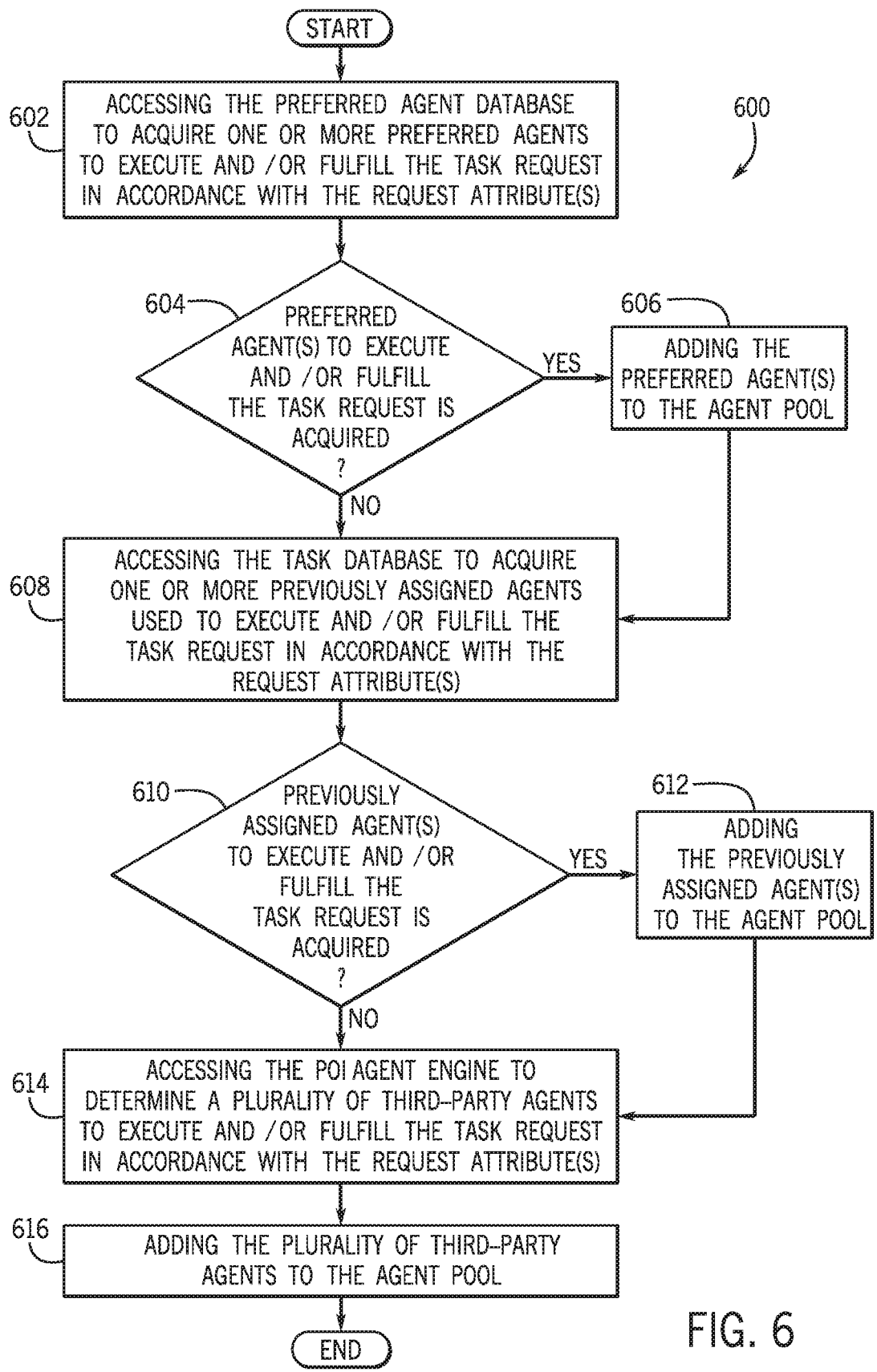
FIG. 6 is a process flow diagram of a method for determining an agent pool to execute and/or fulfill the task request in accordance with at least one request attribute of the task request according to an exemplary embodiment.

FIG. 6 is a process flow diagram of a method 600 for determining the agent pool to execute and/or fulfill the task request in accordance with at least one request attribute of the task request according to an exemplary embodiment. FIG. 6 will be described with reference to the components of FIG. 1A and FIG. 1B, though it is to be appreciated that the method 600 of FIG. 6 may be used with other systems/components. For purposes of simplicity, the method 600 will be described with respect to adding one or more agents to the agent pool 146 to execute and/or fulfill the task request requested by the requestor. However, it is to be appreciated that each of the blocks may be separately and independently executed to add a first agent to the agent pool 146 to execute the task request and to add a second agent to the agent pool 146 to fulfill the task request separately from one another as respectively required.

The method 600 may begin at block 602, wherein the method 600 may include accessing the preferred agent database 130 to acquire one or more preferred agents to execute and/or fulfill the task request in accordance with the request attribute(s). As discussed above, with respect to block 502 of the method 500, the request determinant module 160 may determine the content and category of the task request provided by the requestor.

Accordingly, when the request determinant module 160 communicates data pertaining to the task request, the agent pool determinant module 162 may communicate with the external server 108 to query the task database 128 to retrieve the records associated with the current task request. Upon retrieving the records associated with the current task request, the agent pool determinant module 162 may retrieve information from the records associated with the content and/or category fields of the task database 128.

Upon determining the content and category of the task request, the agent pool determinant module 162 may communicate with the external server 108 to query the preferred agent database 130 to determine if the requestor prefers one or more agents that may be utilized to execute and/or fulfill the particular categories of tasks that include a similar content and/or category as the current task request.

As discussed, the preferred agent database 130 may be populated with a list of preferred agents (e.g., individual agents, family members, friends, groups, businesses) that the requestor or the application 104 has added to the database 130 to execute and/or fulfill a particular type of task request based on the content of the task request and/or the category of the task request. The agent pool determinant module 162 may thereby evaluate one or more records of the preferred agent database 130 to find one or more preferred agents to execute and/or fulfill the task request based on the content and/or category of the task request.

Upon finding one or more preferred agents to execute and/or fulfill the task request based on the content and/or category of the task request, the agent pool determinant module 162 may evaluate one or more records of the preferred agent database 130 to find one or more of the preferred agents to execute and/or fulfill the task request in accordance with one or more additional attributes of the task request, as provided by the requestor and as communicated by the request determinant module 160.

In particular, the agent pool determinant module 162 may evaluate the preferred agents that may execute and/or fulfill the task request based on the content and/or category of the task request to determine if one or more of those preferred agents may also execute and/or fulfill the task request in accordance with one or more of the request attributes of the task request. For example, the agent pool determinant module 162 may evaluate a subset of preferred agents that may execute and/or fulfill the task request within a timeframe, priority, and/or price range included within the request attributes provided by the requestor.

The method 600 may proceed to block 604, wherein the method 600 may include determining if a preferred agent(s) to execute and/or fulfill the task request is acquired. In one embodiment, upon evaluating the one or more records of the preferred agent database 130, the agent pool determinant module 162 may thereby determine if one or more preferred agent(s) are included within the preferred agent database 130 that may execute and/or fulfill the task request provided by the requestor in accordance with one or more of the request attributes of the task request.

If it is determined that the preferred agent(s) to execute and/or fulfill the task request is acquired (at block 604), the method 600 may proceed to block 606, wherein the method 600 may include adding the preferred agent(s) to the agent pool 146. In one embodiment, upon acquiring the preferred agent(s) from the preferred agent database 130 that may execute and/or fulfill the task request in accordance with the request attribute(s) of the task request, the agent pool determinant module 162 may update the agent pool 146 with information that is associated with the current task request.

Upon updating of the agent pool 146, the agent pool determinant module 162 may add data associated with each of the one or more preferred agents that are found to execute and/or fulfill the task request in accordance with the request attribute(s). In other words, the one or more preferred agents found from the preferred agent database 130 may be added to the agent pool 146 to be potentially utilized to execute and/or fulfill the task request provided by the requestor based on an urgency and/or additional criteria associated with the task request.

In one or more configurations, the agent pool 146 may also be updated with one or more designations that describe each of the one or more preferred agents found. For example, the one or more designations may include, but may not be limited to the agent address, the agent type, the requestor relationship, if the agent resides at the same residence as the requestor, an agent priority, and/or a task timeframe in which the agent may be assigned a task. In some embodiments, the designation(s) may be utilized by the task assignment module 168 to determine if one or more of the preferred agents added to the agent pool 146 may be selected to execute and/or fulfill the task request based on the urgency and/or additional criteria associated with the task request.

If it is determined that the preferred agent(s) to execute and/or fulfill the task request are not acquired from the preferred agent database 130 (at block 604) or if the preferred agent(s) have been added to the agent pool (at block 606), the method 600 may proceed to block 608, wherein the method 600 may include accessing the task database 128 to acquire one or more previously assigned agents used to execute and/or fulfill the task request in accordance with the request attribute(s). In one embodiment, the task assignment module 168 may access the task database 128 to retrieve one or more records associated with assigned tasks and/or fulfilled tasks that may include a similar content and category of the current task request to determine one or more agents that were previously assigned to the assigned tasks and/or the fulfilled tasks and that may be utilized to execute and/or fulfill the task request.

Upon acquiring one or more previously assigned agents to execute and/or fulfill the task request based on the content and/or category of the task request, the agent pool determinant module 162 may evaluate one or more records of the task database 128 to find one or more of the previously assigned agents to execute and/or fulfill the task request in accordance with one or more additional attributes of the task request, as provided by the requestor, and as communicated by the request determinant module 160.

In particular, the agent pool determinant module 162 may evaluate the previously assigned agents that were assigned by the application 104 to execute and/or fulfill the one or more assigned tasks and/or one or more fulfilled task requests based on the content and/or category of the task request. The module 160 may further determine if one or more of the previously assigned agents may also execute and/or fulfill the current task request in accordance with one or more of the request attributes of the task request. For example, the agent pool determinant module 162 may evaluate a subset of previously assigned agents that may execute and/or fulfill the task request within a timeframe, priority, and/or price range included within the request attributes provided by the requestor.

The method 600 may proceed to block 610, wherein the method 600 may include determining if the previously assigned agent(s) to execute and/or fulfill the task request is acquired. In one embodiment, upon evaluating the one or more records of the task database 128, the agent pool determinant module 162 may thereby determine if one or more previously assigned agents are included within the task database 128 that may execute and/or fulfill the task request provided by the requestor in accordance with one or more of the request attributes of the task request.

If it is determined that the previous agent(s) to execute and/or fulfill the task request is acquired (at block 610), the method 600 may proceed to block 612, wherein the method 600 may include adding the previously assigned agent(s) to the agent pool 146. In one embodiment, upon acquiring the one or more previously assigned agents from the preferred agent database 130 that may execute and/or fulfill the task request in accordance with the request attribute(s) of the task request, the agent pool determinant module 162 may add data associated with each of the one or more previously assigned agents that are acquired to execute and/or fulfill the task request in accordance with the request attribute(s). In other words, the one or more previously assigned agents found from the task database 128 may be added to the agent pool 146 to be potentially utilized to execute and/or fulfill the task request provided by the requestor based on an urgency and/or additional criteria associated with the task request.

In one or more configurations, the agent pool 146 may also be updated with one or more designations that describe each of the one or more previously assigned agents found.

For example, the one or more designations may include, but may not be limited to the agent address, the agent type, the requestor relationship, if the agent resides at the same residence as the requestor, an agent priority, and/or a task timeframe in which the previously assigned agent may be assigned a task. In some embodiments, the designation(s) may be utilized by the task assignment module 168 to determine if one or more of the previously assigned agents added to the agent pool 146 may be selected to execute and/or fulfill the task request based on an urgency and/or additional criteria associated with the task request.

If it is determined that the previously assigned agent(s) to execute and/or fulfill the task request is not acquired within the task database 128 (at block 610) or the previous assigned agent(s) is added to the agent pool 146 (at block 612), the method 600 may proceed to block 614, wherein the method 600 may include accessing the POI agent engine 134 to determine a plurality of third-party agents to execute and/or fulfill the task request in accordance with the request attribute(s). As discussed above, the POI agent engine 134 may be configured to determine third-party vendors that may be used as an agent by the application 104 when one or more preferred agents are not provided by the requestor requesting the task request. In particular, the POI agent engine 134 may provide a plurality of third-party vendors that may include commercial service providers that may be assigned as the agent to execute and/or fulfill the task request.

In one embodiment, the agent pool determinant module 162 may communicate with the external server 108 to provide one or more request attributes of the task request to the POI agent engine 134. The POI agent engine 134 may evaluate the one or more request attributes to determine a plurality of third-party agents that may be utilized to execute and/or fulfill the task request in accordance with the request attribute(s). More specifically, upon evaluation of the one or more request attributes, the POI agent engine 134 may communicate data to the agent pool determinant module 162. The data may be related to the plurality of third-party agents (e.g., information pertaining to the third-party vendors/service providers) that may allow the task to be executed and/or fulfilled in accordance with the one or more task request attributes of the task request.

As an illustrative example, if the task request attributes include a requested task execution location and a requested task fulfillment location, the POI agent engine 134 may determine a plurality of third-party agents that may be located within a predetermined distance of the requested task execution location or the requested task fulfillment location and may further determine two or more of the plurality of third-party agents to be communicated to the agent pool determinant module 162 to be added to the agent pool 146.

The method 600 may proceed to block 616, wherein the method 600 may include adding the plurality of third-party agents to the agent pool 146. In one embodiment, upon receiving data pertaining to the plurality of third-party agents from the POI agent engine 134, the agent pool determinant module 162 may add data associated with each of the plurality of third-party agents that are determined to execute and/or fulfill the task request in accordance with the request attribute(s). In other words, the plurality of third-party agents provided by the POI agent engine 134 may be added to the agent pool 146 to be potentially selected to execute and/or fulfill the task request provided by the requestor based on an urgency and/or additional criteria associated with the task request.

In one or more configurations, the agent pool 146 may also be updated with one or more designations that describe each of the plurality of third-party agents determined from the POI agent engine 134. For example, the one or more designations may include, but may not be limited to the agent address, the agent type, an agent priority, and/or a task timeframe in which the third-party agent may be assigned a task. In some embodiments, the designation(s) may be utilized by the task assignment module 168 to determine if one or more of the third-party agents added to the agent pool 146 may be utilized to execute and/or fulfill the task request based on an urgency and/or additional criteria associated with the task request.

In an exemplary embodiment, upon adding a plurality of agents to the agent pool 146 that may be utilized to execute and/or fulfill the task request in accordance with the task request attribute(s) of the task request, the agent pool determinant module 162 may communicate data to the candidate location determinant module 164 pertaining to the addition of the plurality of agents to the agent pool 146.

In one or more embodiments, the candidate location determinant module 164 may determine and add a plurality of candidate locations to the candidate list 148. The plurality of candidate locations may include locations at which the task request may be executed and/or fulfilled in accordance with at least one request attribute of the task request as determined by the request determinant module 160. As discussed above, the candidate list 148 may include the plurality of candidate locations (e.g., vendors, pick-up location, drop-off location) that may potentially be assigned as the task execution location and/or the task fulfillment location.

As discussed above, the candidate list 148 may be included as a data list that may be executed and stored by the external server 108 and may be accessed, populated, and/or read by the modules 166, 168 of the task assignment application 104. As discussed, the candidate location determinant module 164 may add the plurality of candidate locations to the agent pool (e.g., data associated with names and associated information pertaining to one or more agents) that may be further evaluated in order to assign a particular agent to execute and fulfill the task request.

Figure 7:
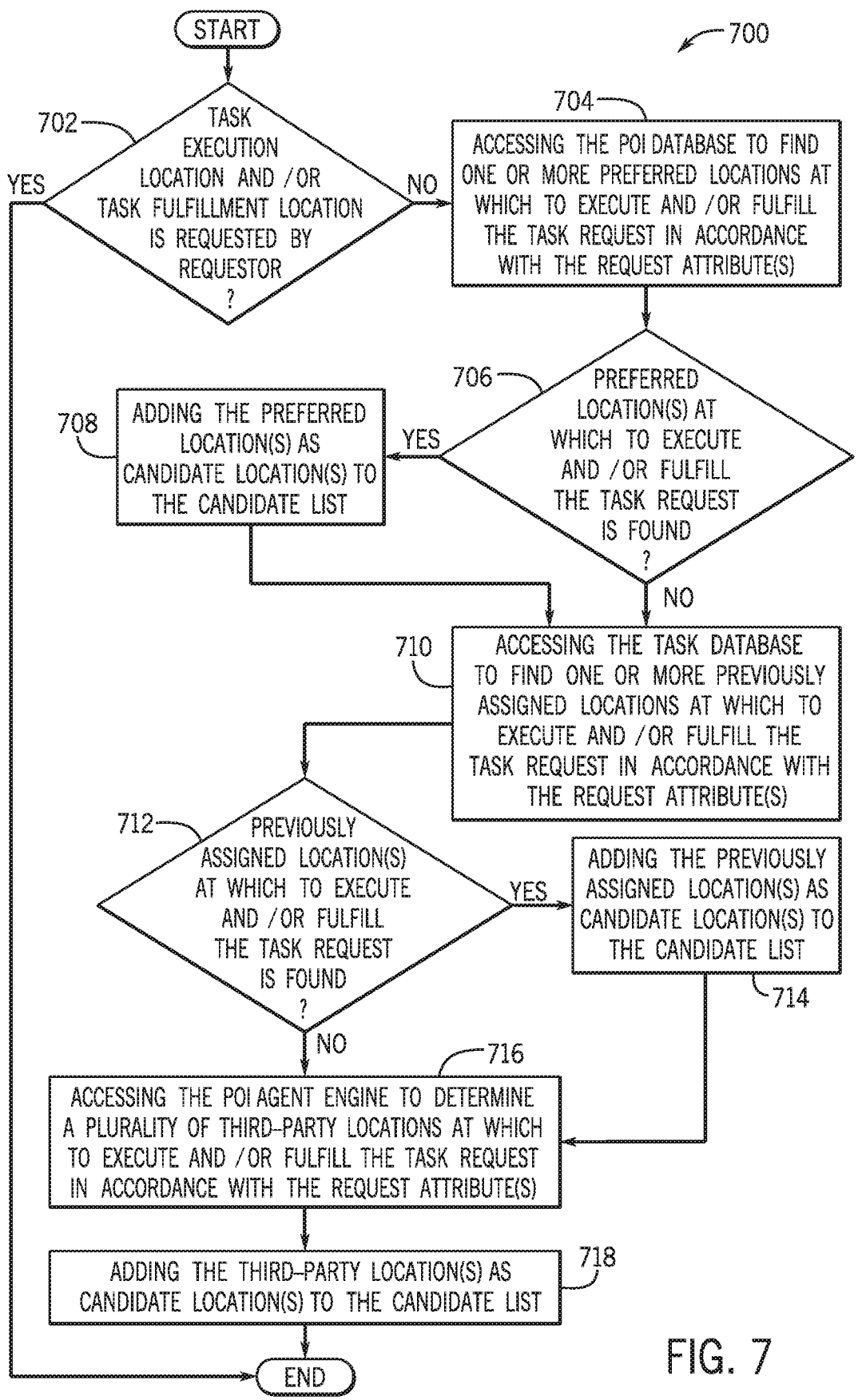
FIG. 7 is a process flow diagram of a method for determining a plurality of candidate locations at which to execute and/or fulfill the task request in accordance with at least one request attribute of the task request according to an exemplary embodiment.

FIG. 7 is a process flow diagram of a method 700 for determining the plurality of candidate locations at which to execute and/or fulfill the task request in accordance with at least one request attribute of the task request according to an exemplary embodiment. FIG. 7 will be described with reference to the components of FIG. 1A and FIG. 1B, though it is to be appreciated that the method 700 of FIG. 7 may be used with other systems/components. For purposes of simplicity, the method 700 will be described with respect to adding one or more task execution locations and/or task fulfillment locations as candidate locations within the candidate list 148. However, it is to be appreciated that each of the blocks may be separately and independently executed to add a task execution location and to add a task fulfillment location separately from one another as respectively required.

The method 700 may begin at block 702, wherein the method 700 may include determining if a task execution location and/or a task fulfillment location is requested by the requestor. In an exemplary embodiment, the candidate location determinant module 164 may analyze the data pertaining to the content, category, and one or more request attributes of the task request as communicated by the request determinant module 160 to determine if one or more of the task attributes associated with at least one statement of the requestor's task request pertain to the request of a particular task execution location and/or task fulfillment location.

As discussed above, with respect to block 510 of the method 500, the request determinant module 160 may determine if the requestor has requested the task execution location and/or the task fulfillment location based on the analysis of at least one statement. Accordingly, if the request determinant module 160 communicates data pertaining to the requested task execution location and/or task fulfillment location, the candidate location determinant module 164 may determine that the task execution location and/or the task fulfillment location is requested by the requestor.

In an alternate embodiment, the candidate location determinant module 164 may communicate with the external server 108 to query the task database 128 to retrieve the records associated with the current task request. Upon retrieving the records associated with the current task request, the task location assignment module 166 may determine if the records associated with the task execution location field and/or the task fulfillment location field have been updated by the request determinant module 160. If the records associated with the task execution location field and/or the task fulfillment location field have been updated, the candidate location determinant module 164 may determine that the task execution location and/or the task fulfillment location is requested by the requestor.

If it is determined that the task execution location and/or the task fulfillment location is not requested by the requestor (at block 702), the method 700 may proceed to block 704, wherein the method 700 may include accessing the POI database 132 to find one or more preferred locations at which to execute and/or fulfill the task request in accordance with the request attribute(s). As discussed above, with respect to block 502 of the method 500, the request determinant module 160 may determine the content and category of the task request provided by the requestor.

Accordingly, when the request determinant module 160 communicates data pertaining to the task request, the candidate location determinant module 164 may communicate with the external server 108 to query the task database 128 to retrieve the records associated with the current task request. Upon retrieving the records associated with the current task request, the agent pool determinant module 162 may retrieve information from the records associated with the content and/or category fields of the task database 128.

Upon determining the content and category of the task request, the candidate location determinant module 164 may communicate with the external server 108 to query the POI database 132 to determine if the requestor prefers one or more locations that may be utilized as the task execution location and/or the task fulfillment location with respect to the particular categories of tasks that include a similar content and/or category as the currently requested task. As discussed above, the POI database 132 may include records that indicate one or more points of interest that may be frequently used as task execution locations and/or task fulfillment locations that are preferred to the requestor. The one or more preferred points of interest may include one or more categories of locations, individual addresses, and/or vendors that may be utilized to facilitate one or more types of task requests.

In one embodiment, the candidate location determinant module 164 may evaluate the one or more records to find one or more task execution locations at which to execute the task request and/or one or more task fulfillment locations at which to fulfill the task request. Upon finding one or more task execution locations and/or one or more task fulfillment locations based on the content and/or category of the task request, the candidate location determinant module 164 may evaluate the task execution location(s) and/or the task fulfillment location(s) based on the content and/or category of the task request to determine if one or more of the task execution locations and/or task fulfillment locations found within the POI database 132 may be utilized to execute and/or fulfill the task request in accordance with one or more of the request attributes of the task request. For example, the candidate location determinant module 164 may evaluate a subset of task execution locations and/or task fulfillment locations that may be utilized to execute and/or fulfill the task request within a timeframe, priority, and/or price range included within the request attributes provided by the requestor.

The method 700 may proceed to block 706, wherein the method 700 may include determining if the preferred location(s) at which to execute and/or fulfill the task request is found. In one embodiment, upon evaluating the one or more records of the POI database 132, the candidate location determinant module 164 may thereby determine if one or more points of interest are included within the POI database 132 that may be utilized as one or more task execution locations and/or one or more task fulfillment locations in accordance with one or more of the request attributes of the task request.

If it is determined that the preferred location(s) at which to execute and/or fulfill the task request is found at block 706, the method 700 may proceed to block 708, wherein the method 700 may include adding the preferred location(s) as candidate location(s) to the candidate list 148. In one embodiment, upon finding the preferred location(s) from the POI database 132 that may be utilized as task execution locations and/or task fulfillment locations based on the request attribute(s) of the task request, the candidate location determinant module 164 may update the candidate list 148 with information that is associated with the current task request.

Upon updating of the candidate list 148, the candidate location determinant module 164 may add data associated with each of the one or more preferred locations that are found from the POI database 132 in accordance with the request attribute(s). In other words, the one or more preferred location(s) found from the POI database 132 may be added to the candidate list 148 to be potentially utilized as the task execution locations at which the task request may be executed and/or the task fulfillment location at which the task request may be fulfilled based on an urgency and/or additional criteria associated with the task request.

In one or more configurations, the candidate list 148 may also be updated with one or more designations that describe each of the one or more preferred locations found. For example, the one or more designations may include, but may not be limited to the location description, a location address, a category of the location (e.g., home, grocery store, restaurant), hours of operations associated with the location, etc. In some embodiments, the designation(s) may be utilized by the task location assignment module 166 to determine if one or more of the preferred locations added to the candidate list 148 may be utilized as the task execution location and/or the task fulfillment location based on an urgency and/or additional criteria associated with the task request.

If it is determined that the preferred location(s) at which to execute and/or fulfill the task request is not found (at block 706) or if the preferred location(s) are added as one or more candidate locations to the candidate list 148 (at block 708), the method 700 may proceed to block 710, wherein the method 700 may include accessing the task database to find one or more previously assigned locations at which to execute and/or fulfill the task request in accordance with the request attribute(s). In one embodiment, the candidate location determinant module 164 may access the task database 128 to retrieve one or more records associated with assigned tasks and/or fulfilled tasks that may include a similar content and/or category of the current task request to determine one or more task execution locations and/or one or more task fulfillment locations that were previously assigned to the assigned tasks and/or the fulfilled tasks and that may be utilized to execute and/or fulfill the task request.

Upon finding one or more previously assigned task execution locations and/or task fulfillment locations based on the content and/or category of the task request, the candidate location determinant module 164 may evaluate the previously assigned task execution locations and/or previously assigned task fulfillment locations that were assigned by the application 104 with respect to one or more assigned tasks and/or one or more fulfilled tasks. The module 164 may further determine if one or more of those previously assigned task execution locations and/or task fulfillment locations may also be utilized as locations at which the current task request may be executed and/or fulfilled in accordance with one or more of the request attributes of the task request. For example, the candidate location determinant module 164 may evaluate a subset of previously assigned task execution locations to determine if one or more of the previously assigned task execution locations may be utilized to allow the task to be executed within a requested timeframe, requested priority, and/or requested price range included within the request attributes provided by the requestor.

The method 700 may proceed to block 712, wherein the method 700 may include determining if the previously assigned location(s) at which to execute and/or fulfill the task request is found. In one embodiment, upon evaluating the one or more records of the task database 128, the agent pool determinant module 162 may thereby determine if one or more previously assigned task execution locations and/or task fulfillment locations are included within the task database 128 at which the task request may be executed and/or fulfilled in accordance with one or more of the request attributes of the task request.

If it is determined that the previously assigned location(s) at which to execute and/or fulfill the task request is found, the method 700 may proceed to block 714, wherein the method 700 may include adding the previously assigned location(s) as candidate location(s) to the candidate list 148. In one embodiment, upon finding the one or more previously assigned task execution locations and/or task fulfillment locations from the task database 128, the candidate location determinant module 164 may add data associated with each of the one or more previously assigned agents that are found to execute and/or fulfill the task request based on the request attribute(s). In other words, the one or more previously assigned task execution locations and/or previously assigned task fulfillment locations found from the task database 128 may be added to the candidate list 148 to be potentially utilized based on an urgency and/or additional criteria associated with the task request.

In one or more configurations, the candidate list 148 may also be updated with one or more designations that describe each of the one or more previously assigned task execution locations and/or task fulfillment locations found. For example, the one or more designations may include, but may not be limited to the location description, a location address, a category of the location, hours of operations associated with the location, etc. In some embodiments, the designation(s) may be utilized by the task location assignment module 166 to determine if one or more of the previously assigned locations added to the candidate list 148 may be utilized as the task execution location and/or the task fulfillment location based on an urgency and/or additional criteria associated with the task request.

If it is determined that the previously assigned location(s) at which to execute and/or fulfill the task request is not found (at block 712) or the previous added location(s) is added as a candidate location(s) to the candidate list 148 (at block 714), the method 700 may proceed to block 716, wherein the method 700 may include accessing the POI agent engine 134 to determine a plurality of third-party locations at which to execute and/or fulfill the task request based on the request attribute(s). As discussed above, the POI agent engine 134 may be configured to provide one or more third-party vendors (e.g., stores) that may be used as a task execution location and/or a task fulfillment location by the application 104 when the task execution location and/or the task fulfillment location are not provided by the requestor within the spoken task request. In particular, the POI agent engine 134 may provide one or more third-party vendors such as one or more commercial service providers, commercial businesses, and/or one or more locations (e.g., addresses) that may be assigned as the location at which the task request may be executed and/or fulfilled.

In one embodiment, the candidate location determinant module 164 may communicate with the external server 108 to provide one or more request attributes (as determined and communicated by the request determinant module 160) to the POI agent engine 134. The POI agent engine 134 may evaluate the one or more request attributes and may provide a plurality of third-party locations that may be utilized as task execution locations and/or the task fulfillment locations that enable the execution and/or fulfillment of the task request in accordance with the task request attributes. The POI agent engine 134 may thereby communicate respective data pertaining to the plurality of third-party locations to the candidate location determinant module 164.

The method 700 may proceed to block 718, wherein the method 700 may include adding the plurality of third-party locations as candidate locations to the candidate list 148. In an exemplary embodiment, upon receipt of the data pertaining to the plurality of third-party locations, the candidate location determinant module 164 may communicate with the external server 108 to access the candidate list 148. The candidate location determinant module 164 may add the task execution locations and/or the task fulfillment locations that are included as part of the plurality of third-party locations.

In one or more configurations, the candidate list 148 may also be updated with one or more designations that describe each of the plurality of third-party locations provided by the POI agent engine 134. For example, the one or more designations may include, but may not be limited to a location description, a location address, a category of the location, hours of operations associated with the location, etc. In some embodiments, the designation(s) may be utilized by the task location assignment module 166 to determine if one or more of the plurality of third-party locations may be utilized as the task execution location and/or the task fulfillment location based on an urgency and/or additional criteria associated with the task request.

With continued reference to FIG. 1A and FIG. 1B, upon determining the plurality of candidate locations and adding the plurality of candidate locations and associated designations to the candidate list 148, the candidate location determinant module 164 may communicate respective data to the task location assignment module 166. In an exemplary embodiment, the task location assignment module 166 may evaluate the urgency associated with the task request and criteria associated with the task request to assign one of the plurality of candidate locations as the task execution location and/or the task fulfillment location.

Figure 8:
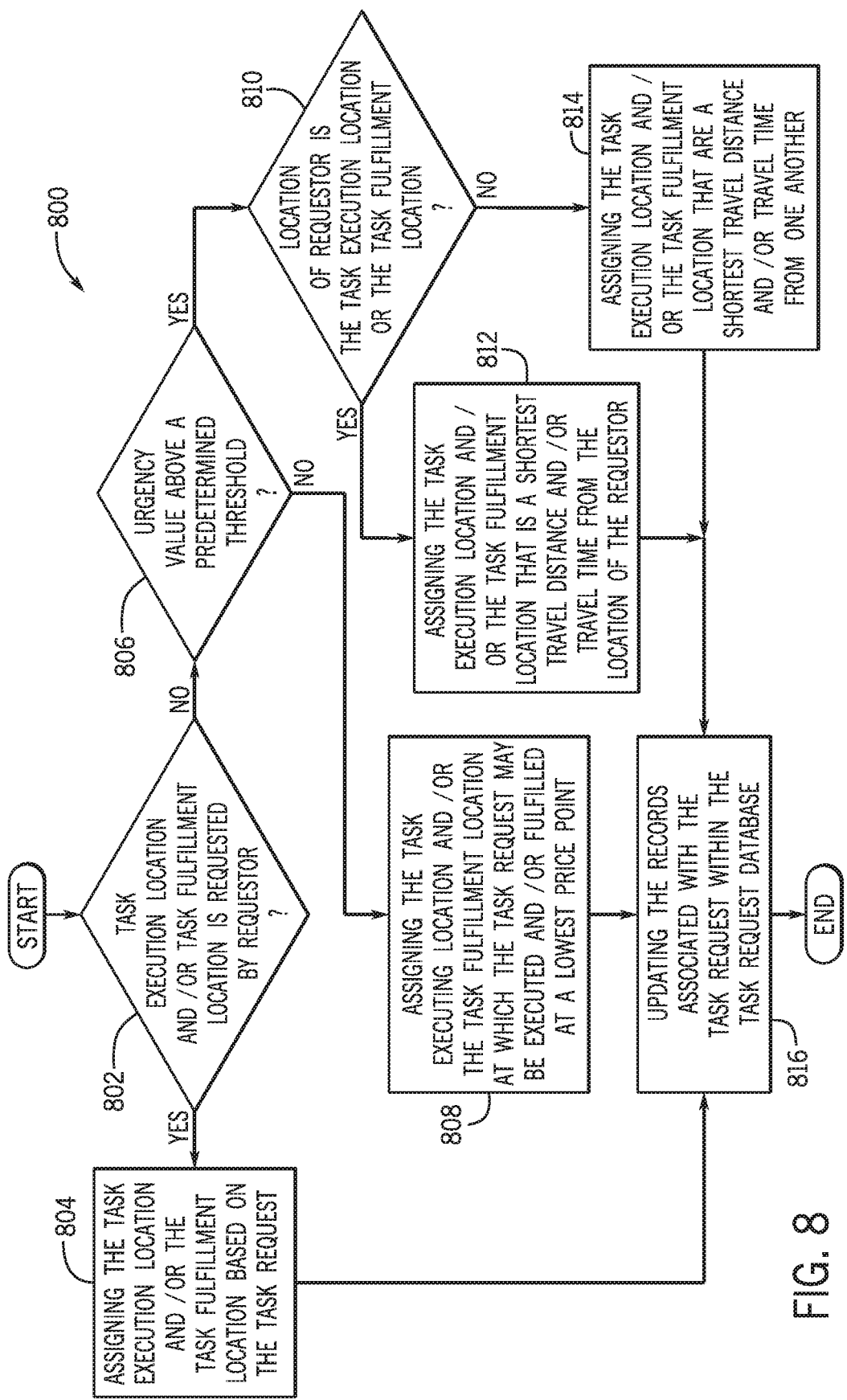
FIG. 8 is a process flow diagram of a method for assigning a task execution location and/or a task fulfillment location from the plurality of candidate locations according to an exemplary embodiment.

FIG. 8 is a process flow diagram of a method 800 for assigning the task execution location and/or the task fulfillment location from the plurality of candidate locations according to an exemplary embodiment. FIG. 8 will be described with reference to the components of FIG. 1A and FIG. 1B, though it is to be appreciated that the method 800 of FIG. 8 may be used with other systems/components. For purposes of simplicity, the method 800 will be described with respect to assigning the task execution location and/or the task fulfillment location. However, it is to be appreciated that each of the blocks may be separately and independently executed to assign a task execution location and to assign a task fulfillment location separately from one another as respectively required.

The method 800 may begin at block 802, wherein the method 800 may include determining if the task execution location and/or the task fulfillment location is requested by the requestor. In an exemplary embodiment, the task location assignment module 166 may analyze the data pertaining to the content, category, and one or more request attributes of the task request as communicated by the request determinant module 160 to determine if one or more of the task attributes associated with at least one statement of the requestor's task request pertain to the request of a particular task execution location and/or task fulfillment location.

As discussed above, with respect to block 510 of the method 500, the request determinant module 160 may determine if the requestor has requested the task execution location and/or the task fulfillment location based on the analysis of at least one statement. Accordingly, if the request determinant module 160 communicates data pertaining to the requested task execution location and/or task fulfillment location, the task location assignment module 166 may determine that the task location is requested in the task request provided by the requestor.

In an alternate embodiment, the task location assignment module 166 may communicate with the external server 108 to query the task database 128 to retrieve the records associated with the current task request. Upon retrieving the records associated with the current task request, the task location assignment module 166 may determine if the records associated with the task execution location field and/or the task fulfillment location field have been updated by the request determinant module 160. If the records associated with the task execution location field and/or the task fulfillment location field have been updated, the task location assignment module 166 may determine that the task execution location and/or the task fulfillment location is requested in the task request.

If it is determined that the task execution location and/or the task fulfillment location is requested by the requestor (at block 802), the method 800 may proceed to block 804, wherein the method 800 may include assigning the task execution location and/or the task fulfillment location based on the task request. In one or more embodiments, upon determining that the task execution location and/or the task fulfillment location is requested, the task location assignment module 166 may assign the task execution location and/or task fulfillment location as determined from the data pertaining to the content, category, and one or more request attributes of the task request as communicated by the request determinant module 160.

In an additional embodiment, the task location assignment module 166 may communicate with the external server 108 and may assign the task execution location and/or the task fulfillment location included within the records associated with the task execution location field and/or the task fulfillment location field of the current task request. As discussed below, an unassigned task may be sent to the agent specified (specified agent) by the requestor or one or more particular agents selected from the agent pool 146 that includes information pertaining to the assigned task execution location and/or task fulfillment location.

In an alternate embodiment, if the plurality of sensors 154 of the connected device(s) 150 determine that a requirement is to be fulfilled, the request determinant module 160 may additionally be configured to analyze and determine the content/category and one or more request attributes of the task request by analyzing the sensor input(s) provided by the plurality of sensors 154 of the connected device(s) 150. The task location assignment module 166 may assign the task execution location and/or task fulfillment location as determined from the data pertaining to the content, category, and one or more request attributes of the task request based on the analysis of the sensor input(s) provided by the plurality of sensors 154 of the connected device(s) 150.

If it is determined that the task execution location and/or the task fulfillment location is not requested by the requestor (at block 802), the method 800 may proceed to block 806, wherein the method 800 may include determining if the urgency value is above a predetermined threshold. As discussed above (with respect to block 516 of FIG. 5), the request determinant module 160 may determine the urgency associated with the task request based on one or more request attributes of the task request and may assign the urgency value associated with the task request. In one embodiment, the task location assignment module 166 may compute a predetermined threshold value that may be utilized to determine a level or urgency that may be used to assign the task execution location and/or the task fulfillment location.

In some embodiments, the predetermined threshold value may be a dynamic value that may change based on a number of task requests, unassigned tasks, and/or assigned tasks within the task database 128. In additional embodiments, the predetermined threshold value may be a dynamic value that may change based on information pertaining to the hours of operation of one or more candidate locations included within the candidate list 148. In yet some embodiments, the predetermined threshold may be a dynamic value based on a time frame and/or time of day in which the task request is to be executed and/or fulfilled as communicated by the request determinant module 160.

In an exemplary embodiment, the task location assignment module 166 may compare the urgency value (as communicated by the request determinant module 160) with the predetermined threshold to determine if the urgency value is above the predetermined threshold or below the predetermined threshold. It is to be appreciated that the task location assignment module 166 may compute numerous predetermined threshold values that may be utilized to determine numerous levels of urgency to assign the task execution location and/or the task fulfillment location.

If it is determined that the urgency value is not above the predetermined threshold (at block 806), the method 800 may proceed to block 808, wherein the method 800 may include assigning the task execution location and/or the task fulfillment location at which the task request may be executed and/or fulfilled at a lowest price point. In an exemplary embodiment, upon determining that the urgency value is below the predetermined threshold, the task location assignment module 166 may determine that urgency may not be a primary criteria in executing and/or fulfilling the task request. Accordingly, the task location assignment module 166 may assign one or more of the plurality of candidate locations as the task execution location and/or the task fulfillment location based on pricing criteria.

In one embodiment, the task location assignment module 166 may access the candidate list 148 and may evaluate each of the plurality of candidate locations (candidate task execution location vendors/service providers and/or candidate task fulfillment location vendors/service providers) to determine pricing schemes/price points that may apply to each of the candidate locations with respect to executing and/or fulfilling the task request. In one configuration, the task location assignment module 166 may additionally communicate data associated with each of the plurality of candidate locations to the pricing engine 136 to determine pricing schemes/price points that may apply to each of the plurality of candidate locations with respect to executing and/or fulfilling the task request.

Upon receiving data with respect to each of the candidate locations, the pricing engine 136 may be configured to communicate one or more pricing schemes/price points that are applicable to each of the candidate locations with respect to executing and/or fulfilling the task request. The task location assignment module 166 may thereby analyze the pricing schemes/price points that are applicable to each of the candidate locations and may determine the candidate location from the candidate list 148 at which the task request may be executed at a lowest price point and/or the candidate location from the candidate list 148 at which the task request may be fulfilled at a lowest price point. The task location assignment module 166 may consequently assign the task execution location as the candidate location at which the task request may be executed at the lowest price point and/or may assign the task fulfillment location as the candidate location at which the task request may be executed at the lowest price point.

In some circumstances, if the task execution location determines more than one candidate location from the candidate list 148 at which the task request may be executed at a lowest equivalent price point and/or at which the task request may be fulfilled at a lowest equivalent price point, the task location assignment module 166 may assign one of the plurality candidate locations accordingly based on the particular candidate location at which the task request may be executed and/or fulfilled according to the one or more additional request attributes of the task request (e.g., time frame) and/or the urgency value assigned to the task request.

If it is determined that the urgency value is above the predetermined threshold (at block 806), the method 800 may proceed to block 810, wherein the method 800 may include determining if the location of the requestor is the task execution location or the task fulfillment location. In one embodiment, if the task execution location and/or the task fulfillment location is requested by the requestor, the task location assignment module 166 may determine if the assigned task execution location or the assigned task fulfillment location (assigned at block 804) is the location at which the requestor resides and/or is the location at which the requestor is/will be located.

In particular, the task location assignment module 166 may access the profile associated with the requestor (created during the configuration phase of the application 104). As discussed, the profile may include the requestor's name, home address, work place address, additional addresses, telephone number, VIN, payment information (e.g., credit card numbers), a respective device identification (serial number, internet protocol address, physical address where the connected device(s) 150 is utilized) of the one or more connected devices 150 utilized by the requestor, and the like.

The task location assignment module 166 may evaluate one or more of the addresses, the location of the portable device 106a as provided by the location sensors 142a, the location of the connected device(s) 150 based on the stored internet protocol address/physical address, and/or the location of the vehicle 102 occupied by the requestor as provided by the navigation system 118. The module 166 may analyze/compare the aforementioned addresses or determined locations associated with the requestor with respect to the assigned task execution location or the assigned task fulfillment location to determine if the location of the requestor is the task execution location or the task fulfillment location.

As an illustrative example, if the requestor provides a task request which includes the statement to a connected device 150 configured as a personal electronic assistant "I need a ride from my house to go to the airport," the request determinant module 160 may have determined the requested task execution location as "home" and may utilize the user's home address and/or the stored physical address of the connected device 150 stored in the user's profile as the requested task execution location. Accordingly, the task location assignment module 166 may determine that the task execution location is the location of the requestor (at which the requestor resides).

If it is determined that the location of the requestor is the task execution location or the task fulfillment location (at block 810), the method 800 may proceed to block 812, wherein the method 800 may include assigning the task execution location and/or the task fulfillment location that is a shortest travel distance and/or travel time from the location of the requestor. In an exemplary embodiment, if the task location assignment module 166 determines that the task fulfillment location is the location of the requestor, the task assignment module 168 may access the candidate list 148 to determine the geo-location (e.g., physical address, GPS coordinates) of each of the plurality of candidate task execution locations included within the candidate list 148.

In one embodiment, upon determining the geo-location of each of the plurality of candidate task execution locations, the task location assignment module 166 may communicate with the POI agent engine 134 and/or the navigation system 118 of the vehicle 102 to determine travel distances and/or travel times (e.g., based on traffic patterns at the timeframe of the task request) from each of the plurality of the candidate task execution locations to the task fulfillment location/location of the requestor. Upon determining the travel distances and/or the travel times, the task location assignment module 166 may evaluate each of the travel distances and/or travel times and may assign the task execution location as the candidate task execution location from which the task fulfillment location/location of the requestor is accessed/reached within a shortest travel distance and/or shortest travel time.

If the task location assignment module 166 determines that the task execution location is the location of the requestor, the task assignment module 168 may access the candidate list 148 to determine the geo-location (e.g., physical address, GPS coordinates) of each of the plurality of candidate task fulfillment locations included within the candidate list 148. In one embodiment, upon determining the geo-location of each of the plurality of candidate task fulfillment locations, the task location assignment module 166 may communicate with the POI agent engine 134 and/or the navigation system 118 of the vehicle 102 to determine travel distances and/or travel times (e.g., based on traffic patterns at the timeframe of the task request) from the task execution location/location of the requestor to each of the plurality of the candidate task fulfillment locations. Upon determining the travel distances and/or the travel times, the task location assignment module 166 may evaluate each of the travel distances and/or travel times and may assign the task fulfillment location as the candidate task fulfillment location which may be accessed/reached from the task execution location/location of the requestor within a shortest travel distance and/or shortest travel time.

With reference again to FIG. 8, if it is not determined that the location of the requestor is the task execution location and/or the task fulfillment location (at block 810), the method 800 may proceed to block 814, wherein the method 800 may include assigning the task execution location and/or the task fulfillment location that are a shortest travel distance and/or travel time from one another. In an exemplary embodiment, if the task execution location and/or the task fulfillment location are not determined to be the location of the requestor, the task location assignment module 166 may access the candidate list to determine the geo-locations of each of the plurality of candidate task execution locations and the geo-locations of each of the plurality of candidate task fulfillment locations.

In one embodiment, the task location assignment module 166 may communicate with the POI agent engine 134 and/or the navigation system 118 of the vehicle 102 to determine travel distances and/or travel times (e.g., based on traffic patterns at the timeframe of the task request) from each of the plurality of candidate task execution locations to each of the plurality of the candidate task fulfillment locations. In another embodiment, if the task execution location is determined (at block 804), the task location assignment module 166 may communicate with the POI agent engine 134 and/or the navigation system 118 of the vehicle 102 to determine travel distances and/or travel times from the assigned task execution location to each of the plurality of the candidate task fulfillment locations.

In yet another embodiment, if the task fulfillment location is determined (at block 804), the task location assignment module 166 may communicate with the POI agent engine 134 and/or the navigation system 118 of the vehicle 102 to determine travel distances and/or travel times from each of the plurality of candidate task execution locations to the assigned task fulfillment location. Upon determining the travel distances and/or the travel times, the module 166 may evaluate each of the travel distances and/or travel times and may assign the task execution location and/or the task fulfillment location respectively as the candidate task execution location and the candidate task fulfillment location that are located within a shortest travel distance and/or shortest travel time from one another or from an assigned task location.

Upon assigning the task execution location and/or the task fulfillment location (at blocks 804, 808, 812, or 814), the method 800 may proceed to block 816, wherein the method 800 may include updating the records associated with the task request within the task database 128. In an exemplary embodiment, upon assigning the task execution location and/or the task fulfillment location, the task location assignment module 166 may communicate with the external server 108 to access the task database 128. Upon accessing the task database 128, the task location assignment module 166 may update the records pertaining to the task request with the assigned task execution location and the assigned task fulfillment location. The task location assignment module 166 may additionally communicate respective data pertaining to the assigned task execution location and the assigned task fulfillment location to the task assignment module 168 of the task assignment application 104.

With continued reference to FIG. 1A and FIG. 1B, the task assignment module 168 may utilize the assigned task execution location and/or the assigned task fulfillment location to select one or more agents included within the agent pool 146 that may be utilized to execute and/or fulfill the task request. As discussed below, in some circumstances, an agent selected by the task assignment module 168 may be assigned to execute and/or fulfill an assigned task (task) that is associated with the task request provided by the requestor.

Figure 9:
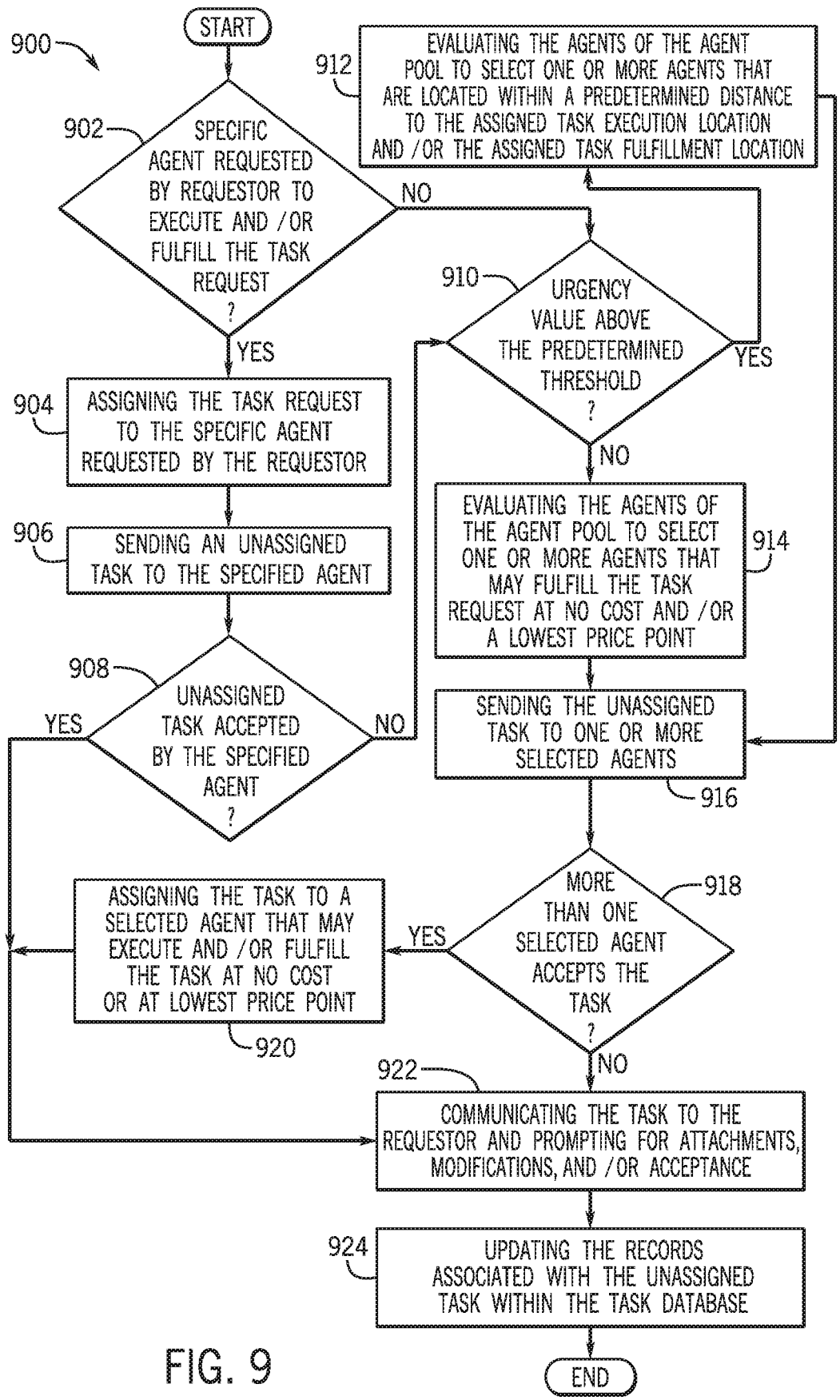
FIG. 9 is a process flow diagram of a method for assigning an agent from the agent pool to execute and/or fulfill the task request according to an exemplary embodiment.

FIG. 9 is a process flow diagram of a method 900 for assigning an agent from the agent pool to execute and/or fulfill the task request according to an exemplary embodiment. FIG. 9 will be described with reference to the components of FIG. 1A and FIG. 1B, though it is to be appreciated that the method 900 of FIG. 9 may be used with other systems/components. For purposes of simplicity, the method 900 will be described with respect to assigning an agent to execute and/or fulfill the task request. However, it is to be appreciated that each of the blocks may be separately and independently executed to assign an agent to execute a task and to assign an agent to fulfill the task separately from one another as respectively required.

The method 900 may begin at block 902, wherein the method 900 may include determining if a specific agent is requested by the requestor to execute and/or fulfill the task request. In an exemplary embodiment, the task assignment module 168 may analyze the data pertaining to the content, category, and one or more request attributes of the task request as communicated by the request determinant module 160 to the task assignment module 168. The task assignment module 168 may analyze the data to determine if one or more of the task attributes associated with at least one statement of the requestor's task request pertain to a specific agent to execute and/or fulfill the task request. As discussed above, with respect to block 508 of the method 500, the request determinant module 160 may determine if the requestor has requested a specific agent based on the analysis of at least one statement. Accordingly, if the request determinant module 160 communicates data pertaining to the specific agent requested, the task assignment module 168 may determine the specific agent that is requested in the task request provided by the requestor.

In an alternate embodiment, the task assignment module 168 may communicate with the external server 108 to query the task database 128 to retrieve the records associated with the current task request. Upon retrieving the records associated with the current task request, the task assignment module 168 may determine if the record associated with the specified agent has been updated by the request determinant module 160. If the record associated with the specified agent field has been updated, the task assignment module 168 may determine that the specified agent is requested in the task request.

If it is determined that a specific agent is requested by the requestor to execute and/or fulfill the task request (at block 902), the method 900 may proceed to block 904, wherein the method 900 may include assigning the task request to the specific agent requested by the requestor. In one or more embodiments, upon determining that a specific agent is requested, the task assignment module 168 may assign the specific agent as the agent to execute the task request and/or fulfill the task request as determined from the data pertaining to the content, category, and one or more request attributes of the task request as communicated by the request determinant module 160.

The method 900 may proceed to block 906, wherein the method 900 may include sending an unassigned task to the specified agent. In one embodiment, upon the assignment of the task execution location and/or the task fulfillment location, the task assignment module 168 may create an unassigned task associated with the task request. In particular, the task assignment module 168 may create the unassigned task (e.g., data file) that may be populated with the requestor's information, the content and category of the task request, the assigned task execution location, the assigned task fulfillment location, the urgency of the task request, and one or more additional request attributes determined and communicated by the request determinant module 160 pertaining to the task request. The task assignment module 168 may also access the external server 108 and may update the records associated with the task request with data pertaining to the unassigned task and may thereby update the status of the task request to an unassigned task.

Upon creating the unassigned task, the task assignment module 168 may send the unassigned task to the specified agent. In particular, the task assignment module 168 may present the unassigned task user interface through the display unit 114 and/or the portable device 106a used by the specified agent and/or the display unit 114 of the vehicle 102 occupied by the specified agent. The unassigned task user interface may present the populated data of the unassigned task as created by the task assignment module 168.

The method 900 may proceed to block 908, wherein the method 900 may include determining if the unassigned task is accepted by the specified agent. In one embodiment, the unassigned task user interface may include a task response user interface icon that may be inputted to provide a spoken response to the unassigned task to the application 104. The spoken response may include a statement pertaining to the acceptance or rejection of the unassigned task. In some configurations, the spoken response may include a phrase or question that may be provided to the task assignment module 168 such as a question related to the unassigned task that may be analyzed by the application 104.

In one configuration, the task assignment module 168 may utilize the command interpreter 126 of the vehicle 102, the command interpreter of the connected device(s) 150 utilized by the requestor, and/or the command interpreter of the portable device 106a to determine if the spoken response is a response to accept the task request or a response to reject the task request. Upon receiving the spoken acceptance or rejection of the unassigned task, the unassigned task user interface may present the specified agent with a user interface message that pertains to the acceptance or rejection of the unassigned task.

In another embodiment, the unassigned task user interface may be presented with an acceptance prompt that allows the specified agent to accept the unassigned task and a rejection prompt that allows the specified agent to reject the unassigned task. Upon inputting the acceptance prompt or the rejection prompt, the unassigned task user interface may present the agent with a user interface message that pertains to the acceptance or the rejection of the unassigned task. In some embodiments, the task assignment module 168 may determine that the task has been rejected by the specified agent if the module 160 determines that a spoken response or input has not been received with respect to the acceptance of the task by the specified agent within a predetermined period of time (e.g., based on the priority, timeframe(s), and/or urgency of the task).

In one embodiment, if it is determined that the unassigned task is accepted by the specified agent (at block 908), the task assignment module 168 may convert the unassigned task into a task and may assign the task to the specified agent to be executed and/or fulfilled. The method 900 may proceed to block 922, as discussed in more detail below. If it is determined that the unassigned task is not accepted by the specified agent (at block 908) or the specific agent is not requested by the requestor to execute and/or fulfill the task request (at block 902), the method 900 may proceed to block 910, wherein the method 900 may include determining if the urgency value is above a predetermined threshold.

As discussed above (with respect to block 516 of FIG. 5), the request determinant module 160 may determine the urgency associated with the task request based on one or more request attributes of the task request and may assign the urgency value associated with the task request. In one embodiment, the task assignment module 168 may compute a predetermined threshold value that may be utilized to determine a level of urgency that may be used to select one or more agents from the agent pool to potentially execute and/or fulfil the task request.

In some embodiments, the predetermined threshold value may be a dynamic value that may change based on a number of task requests, unassigned tasks, and/or assigned tasks within the task database 128. In additional embodiments, the predetermined threshold value may be a dynamic value that may change based on information pertaining to the task category or timeframes of availability associated with the plurality of agents of the agent pool 146. In yet some embodiments, the predetermined threshold may be a dynamic value based on a time frame and/or time of day in which the task request is to be executed and/or fulfilled as communicated by the request determinant module 160.

In an exemplary embodiment, the task assignment module 168 may compare the urgency value (as communicated by the request determinant module 160) with the predetermined threshold to determine if the urgency value is above the predetermined threshold or below the predetermined threshold. It is to be appreciated that the task assignment module 168 may compute numerous predetermined threshold values that may be utilized to determine numerous levels of urgency to select one or more agents of the agent pool 146 to potentially execute and/or fulfill the task request.

If it is determined that the urgency value is above the predetermined threshold (at block 910), the method 900 may proceed to block 912, wherein the method 900 may include evaluating the agents of the agent pool 146 to select one or more agents that are located within a predetermined distance to the assigned task execution location and/or the assigned task fulfillment location. In an exemplary embodiment, the task assignment module 168 may access the agent pool 146 and may evaluate the plurality of agents of the agent pool 146 to determine one or more of the agents that are located within a predetermined distance of the task execution location and/or the task fulfillment location.

In one embodiment, the task assignment module 168 may determine a geo-location of each of the plurality of agents of the agent pool 146 based on real-time location data provided by the location sensors 142b of the respective portable device 106*b* used by each of the agents and/or the real-time location data provided by the navigation system 118 of the vehicle 102 occupied by each of the agents.

The task assignment module 168 may also access the external server 108 to determine the respective locations of each of the agents of the agent pool 146 based on location data associated with each of the agents provided by the POI agent engine 134 and/or included with the preferred agent database 130. In an alternate embodiment, the task assignment module 168 may determine the physical location of each of the agents of the agent pool 146 based on the physical location of the connected devices 150 utilized by each of the agents. The physical location of the connected device(s) 150 may be based on a physical address and/or internet protocol address associated with the connected device(s) 150.

Upon determining the geo-locations or physical locations of each of the agents of the agent pool 146, the task assignment module 168 may communicate with the POI agent engine 134 and/or the navigation system 118 of the respective vehicle 102 occupied by each of the agents to determine the travel distance between each agent's respective location and the task execution location and/or the task fulfillment location. Upon determining the travel distances, the module 160 may determine one or more of the agents of the agent pool 146 that may be located within the predetermined distance (e.g., 2 miles) of the task execution location and/or the task fulfillment location and may thereby select the respective agents of the agent pool 146 to potentially execute and/or fulfill the task request.

Referring again to block 910 of the method 900, if it is determined that the urgency value is not above the predetermined threshold, the method 900 may proceed to block 914, wherein the method 900 may include evaluating the agents of the agent pool 146 to select one or more agents that may fulfill the task request at no travel price and/or a lowest travel price. In an exemplary embodiment, the task assignment module 168 may access the agent pool 146 and may evaluate the plurality of agents of the agent pool 146 to determine one or more of the agents that may have a personal relationship with the requestor.

As discussed above, the preferred agent database 130 may include the agent type field that may include records with types of agents that may have a personal relationship (e.g., family, friend) to the requestor populating the preferred agent database 130. Accordingly, the task assignment module 168 may determine if one or more agents of the agent pool 146 have a personal relationship with the requestor based on analysis of the preferred agent database. If one or more agents that have a personal relationship to the requestor are included within the agent pool 146, the task assignment module 168 may not calculate a travel cost and/or a service cost that is to be collected by the agent(s) with the personal relationship to the requestor. The task assignment module 168 may thereby select the one or more agents of the agent pool that have a personal relationship with the requestor to potentially execute and/or fulfill the task request. In other words the task assignment module 168 may select one or more agents of the agent pool 146 that may execute and/or fulfill the task request without charging the requestor a travel fee and/or a service fee to execute and/or fulfill the task request.

The task assignment module 168 may additionally evaluate the plurality of agents of the agent pool 146 to determine one or more of the agents that may not have a personal relationship with the requestor to determine one or more third-party agents that may execute and/or fulfill the task request at a lowest price point. In particular, the price point may be based on travel fees (e.g., to travel from the task execution location to the task fulfillment location) and/or service fees that are charged by the third-party agents (e.g., delivery services).

In one embodiment, the task assignment module 168 may determine the location (e.g., addresses of third-party service providers) of each of the third-party agents of the agent pool 146 based on real-time location data provided by the location sensors 142*b* of the respective portable device 106*b* used by each of the third-party agents and/or the real-time location data provided by the navigation system 118 of the vehicle 102 used by each of the third-party agents.

The task assignment module 168 may also access the external server 108 to determine the respective locations of each of the third-party agents of the agent pool 146 based on location data associated with each of the third-party agents provided by the POI agent engine 134 and/or included with the preferred agent database 130. In an alternate embodiment, the task assignment module 168 may determine the physical location of each of the third-party agents of the agent pool 146 based on the physical location of the connected devices 150 utilized by each of the third-party agents. The physical location of the connected device(s) 150 may be based on a physical address and/or Internet protocol address associated with the connected device(s) 150.

Upon determining the respective locations of the third-party agents, the task assignment module 168 may communicate with the pricing engine 136 to provide one or more pricing schemes/price points that are associated to each of the respective third-party agents. The task assignment module 168 may thereby utilize the one or more pricing schemes/price points that are associated with each of the respective third-party agents and may calculate a travel cost and/or a service cost that is to be collected by each of the third-party agents of the agent pool 146. The module 160 may thereby determine one or more of the agents that may execute and/or fulfill the task request at a lowest price point (e.g., a lowest travel cost and/or a lowest service cost) and may select the one or more respective agents of the agent pool 146 to potentially execute and/or fulfill the task request.

With continued reference to FIG. 9, the method 900 may proceed to block 916, wherein the method 900 may include sending the unassigned task to one or more selected agents. In one embodiment, upon the selection of one or more of the agents of the agent pool 146 to potentially execute and/or fulfill the task request (at block 912 or at block 914), the task assignment module 168 may create an unassigned task associated with the task request. As discussed above, the task assignment module 168 may create the unassigned task (e.g., data file) that may be populated with the requestor's information, the content and category of the task request, the assigned task execution location, the assigned task fulfillment location, the urgency of the task request, and one or more additional request attributes determined and communicated by the request determinant module 160 pertaining to the task request. The task assignment module 168 may also access the external server 108 and may update the records associated with the task request with data pertaining to the unassigned task and may thereby update the status of the task request to an unassigned task.

Upon creating the unassigned task, the task assignment module 168 may send the unassigned task to the one or more selected agents of the agent pool 146. In particular, the task assignment module 168 may present the unassigned task user interface through the display unit 114 and/or the portable device 106*a* used by each of the one or more selected agents and/or the display unit 114 of the vehicle 102 occupied by each of the one or more selected agents. The unassigned task user interface may present the populated data of the unassigned task as created by the task assignment module 168.

The method 900 may proceed to block 918, wherein the method 900 may include determining if more than one selected agent accepts the unassigned task. As discussed above, the unassigned task user interface may include a task response user interface icon that may be inputted to provide a spoken response pertaining to the acceptance or rejection of the unassigned. In one configuration, the task assignment module 168 may utilize the command interpreter 126 of the vehicle 102, the command interpreter of the connected devices(s) 150, and/or the command interpreter of the portable device 106b to determine if the spoken response is an affirmatory response to accept the task request or a nugatory response to reject the task request. Upon receiving the spoken acceptance or rejection of the unassigned task, the unassigned task user interface may present the selected agent with a user interface message that pertains to the acceptance or rejection of the unassigned task.

In another embodiment, the unassigned task user interface may be presented with an acceptance prompt that allows the acceptance of the unassigned task and a rejection prompt that allows the rejection of the unassigned task. Upon inputting the acceptance prompt or the rejection prompt, the unassigned task user interface may present the selected agent with a user interface message that pertains to the acceptance or the rejection of the unassigned task. In some embodiments, the task assignment module 168 may determine that the task has been rejected by the specified agent if the module 160 determines that a spoken response or input has not been received with respect to the acceptance of the task by the selected agent within a predetermined period of time (e.g., based on the priority, timeframe(s), and/or urgency of the task).

In one embodiment, if it is determined that one selected agent accepts the task (at block 918), the task assignment module 168 may convert the unassigned task into an assigned task (task) and may assign the task to the selected agent that accepts the unassigned task to be executed and/or fulfilled. The method 900 may proceed to block 922, as discussed in more detail below. If it is determined that more than one selected agent accepts the unassigned task (at block 918), the method 900 may proceed to block 920, wherein the method 900 may include assigning the task to a selected agent that may execute and/or fulfill the task at no cost or at the lowest price point. In one embodiment, the task assignment module 168 may convert the unassigned task into the task (i.e., assigned task).

Upon conversion of the unassigned task, the task assignment module 168 may evaluate the selected agents that accepted the unassigned task to determine if any of the selected agents may have a personal relationship (e.g., family, friend) to the requestor (based on the records of the preferred agent database 130). If one of the selected agents that have a personal relationship with the requestor, the task assignment module 168 may assign the task to the selected agent with the personal relationship. If more than one of the selected agents have a personal relationship with the requestor, the task assignment module 168 may access the external server 108 and may analyze the records within the same residence field, agent priority field, task category field, and/or task timeframe field to further determine one selected agent that may be best fit to execute and/or fulfill the task. The module 160 may thereby assign the task to the respective selected agent.

In one or more embodiments, if the task assignment module 168 determines that none of the selected agents that have accepted the unassigned task have a personal relationship with the requestor (i.e., none of the selected agents may execute and/or fulfill the task without charging a travel cost and/or a service cost), the module 160 may evaluate each of the selected agents to determine the selected agent that may execute and/or fulfill the task request at a lowest price point.

In a similar manner as discussed above (at block 914), the task assignment module 168 may determine the location (e.g., addresses of third-party service providers) of each of the selected agents based on real-time location data or on location data associated with each of the third-party agents provided by the POI agent engine 134 and/or included with the preferred agent database 130. Upon determining the respective locations of the selected agents, the task assignment module 168 may communicate with the pricing engine 136 to provide one or more pricing schemes/price points that are associated to each of the respective selected agents. The task assignment module 168 may thereby utilize the one or more pricing schemes/price points that are associated to each of the respective selected agents and may calculate a travel cost and/or a service cost that is to be collected by each of the selected agents that have accepted the unassigned task.

The task assignment module 168 may thereby determine one or more of the agents that may execute and/or fulfill the task request at a lowest price point (e.g., a lowest travel cost and/or a lowest service cost). If more than one of the selected agents may execute and/or fulfill the task request at an equivalent lowest price point, the task assignment module 168 may access the external server 108 and may analyze the records within the agent priority field, task category field, and/or task timeframe field to further determine one selected agent that may be best fit to execute and/or fulfill the task. The module 160 may thereby assign the task to the respective selected agent.

With reference to block 922, upon assigning the task to the assigned agent by the task assignment module 168, the method 900 may include communicating the task to the requestor and prompting for attachments, modifications, and/or acceptance. In one embodiment, the task assignment module 168 may communicate with the head unit 112 of the vehicle 102 occupied by the requestor and/or the processor 138a of the portable device 106a to present a task user interface (not shown) via the display unit 114 of the vehicle 102 and/or through the portable device 106a. In particular, the task user interface may provide a HMI that includes text boxes that are populated with the content, category, request attributes, and associated assignments (e.g., assigned agent information, assigned task execution location, assigned task fulfillment location, and additional request attributes) of the task assigned by the task assignment module 168.

In one embodiment, the task user interface may be presented with an attachments prompt that allows the requestor to add one or more attachments that may be retrieved by the assigned agent upon receipt of the task. The one or more attachments may include one or more document files, picture files, video files, audio files, third-party application links, third-party website links, and the like that may include additional instructions/guidance that the requestor may like to provide to the assigned agent. For example, the requestor may utilize the attachments prompt to attach a grocery list for a task to pick up groceries that may be followed by the assigned agent.

In one or more embodiments, the task user interface may also be presented with a modifications prompt that allows the requestor to modify one or more aspects of the task. Upon inputting the modifications prompt, the task user interface may make each of the text boxes modifiable such that the requestor may change one or more of the aspects of the task created by the task assignment module 168. For example, if the requestor would like to assign a different agent than the agent assigned by the task assignment module 168, the requestor may modify the agent and manually assign an agent of choice which may include a newly added agent, a preferred agent, or another agent from the agent pool 146. The requestor may add the manually assigned agent and in some cases may be prompted to provide additional information (e.g., location of agent) that may be provided to the POI agent engine 134 to determine agent information (e.g., agent address, hours of operation, etc.). If the requestor provides modifications to one or more text boxes of the task user interface, the task assignment module 168 may re-create the task to include the modifications and may send/resend the task to the assigned agent with a prompt to accept or reject the modified task.

In one embodiment, the task user interface may also be presented with an acceptance prompt that allows the requestor to accept the task (with or without modifications provided by the requestor). The input of the acceptance prompt may signify that the requestor is ready and willing to have the task be executed and/or fulfilled by the assigned agent. Upon inputting the acceptance prompt, the task user interface may present the requestor with a user interface message that confirms the requestor's acceptance of the assigned agent, assigned task execution location and/or assigned task fulfillment location.

The method 900 may proceed to block 924, wherein the method 900 may include updating the records associated with the unassigned task within the task database. In an exemplary embodiment, upon acceptance of the task by the agent, the task assignment module 168 may communicate with the external server 108 to access the task database 128. The task assignment module 168 may update the records associated with the unassigned task with data pertaining to the assigned task and may update the status of the unassigned task to an assigned task.

In one embodiment, upon the execution and fulfillment of the task by the agent, the assigned agent may utilize the task user interface to mark the task as fulfilled via the portable device 106b used by the assigned agent and/or the display unit 114 of the vehicle 102 occupied by the assigned agent. Upon the marking of the task as fulfilled, the task assignment module 168 may re-access the task database 128 and may update the records associated with the assigned task executed and fulfilled by the agent. In particular, the task assignment module 168 may update the status field of the task database 128 to change the status of the task from the assigned task to a fulfilled task.

Figure 10:
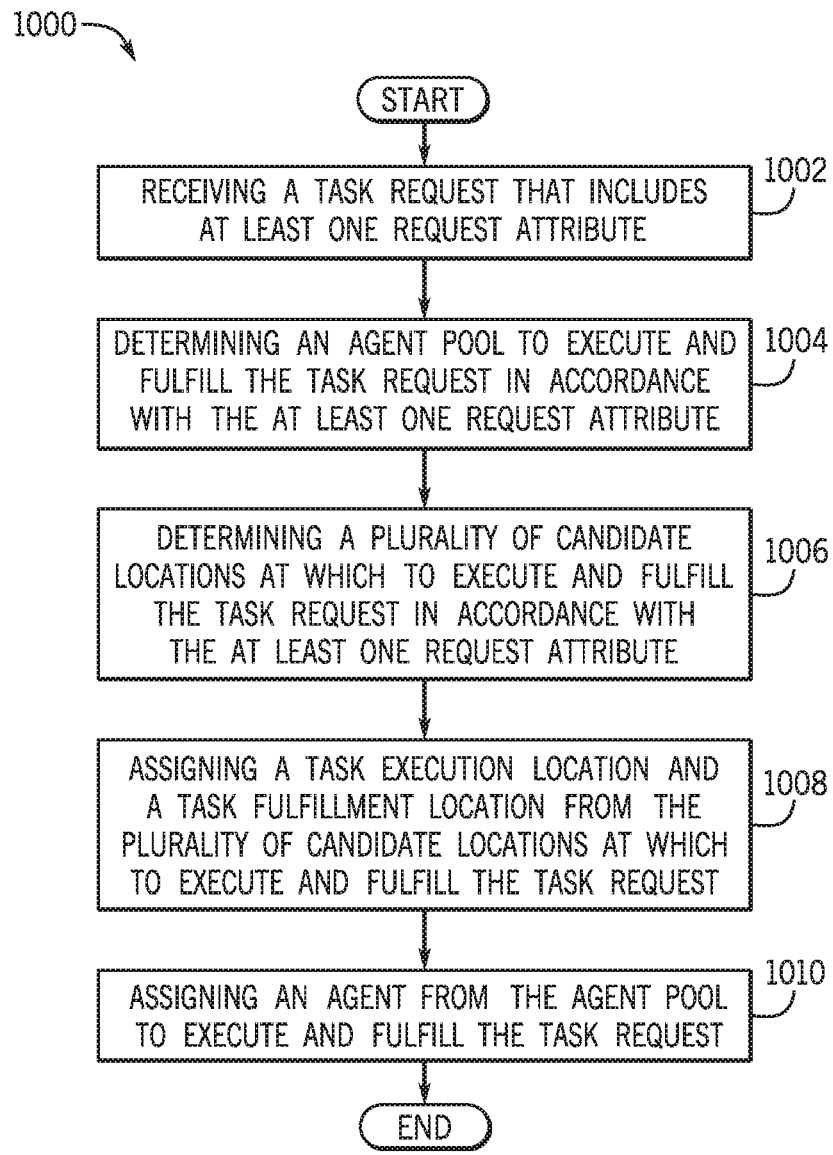
FIG. 10 is a process flow diagram of a method for assigning an agent to execute and fulfill a task request according to an exemplary embodiment.

FIG. 10 is a process flow diagram of a method 1000 for assigning an agent to execute and fulfill a task request according to an exemplary embodiment. FIG. 10 will be described with reference to the components of FIG. 1A and FIG. 1B, though it is to be appreciated that the method 1000 of FIG. 10 may be used with other systems/components. The method 1000 may begin at block 1002, wherein the method 1000 may include receiving a task request that includes at least one request attribute. The method 1000 may proceed to block 1004, wherein the method 1000 may include determining an agent pool to execute and fulfill the task request in accordance with the at least one request attribute.

The method 1000 may proceed to block 1006, wherein the method 1000 may include determining a plurality of candidate locations at which to execute and fulfill the task request in accordance with the at least one request attribute. The method 1000 may proceed to block 1008, wherein the method 1000 may include assigning a task execution location and a task fulfillment location from the plurality of candidate locations at which to execute and fulfill the task request. The method 1000 may proceed to block 1010, wherein the method 1000 may include assigning the agent from the agent pool to execute and fulfill the task request.

It should be apparent from the foregoing description that various exemplary embodiments of the invention may be implemented in hardware.

Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for assigning an agent to execute and fulfill a task request, comprising:
    electronically collecting and electronically receiving at least one electronic data input, wherein the at least one electronic data input includes at least one of: at least one voice electronic data input that pertains to the task request that is spoken and is electronically received by an electronic microphone of at least one connected device and at least one electronic sensor data input that is electronically received from at least one of: a weight sensor, a camera sensor, and a LiDAR sensor of the at least one connected device;
    electronically analyzing the electronic data input to electronically determine the task request based on at least one of: electronic multimodal processing of the at least one voice electronic data input to electronically perform speech pattern recognition to determine at least one phrase that is electronically received by the connected device and execution of at least one of: weight logic, image logic, and LiDAR logic that is stored in an associated memory to electronically interpret a requirement to be fulfilled based on the at least one sensor input to electronically determine at least one request attribute that is associated with the task request;

electronically determining an agent pool to execute and fulfill the task request in accordance with the at least one request attribute based on electronic analysis of data stored upon at least one database that includes data pertaining to at least one preferred agent, electronic analysis of data stored upon at least one additional database that includes data pertaining to at least one agent previously used to execute and fulfill a previous task request, and electronic analysis of data pertaining to a plurality of third-party agents received from at least one computing engine that is configured to communicate with at least one third-party vendor;

electronically analyzing electronic data pertaining to a content of the task request and a category of the task request to determine a plurality of candidate locations at which to execute the task request and a plurality of candidate locations at which to fulfill the task request in accordance with the at least one request attribute;

electronically assigning a task execution location and a task fulfillment location from the plurality of candidate locations at which to execute the task request and the plurality of candidate locations at which to fulfill the task request; and electronically presenting a task user interface that includes the at least one request attribute associated with the task request through a computing device used by a requestor to be electronically accepted through the task user interface, wherein upon electronic acceptance of the at least one request attribute associated with the task request by the requestor a computing device used by at least one agent of the agent pool is electronically controlled to present an unassigned task user interface that includes the at least one request attribute associated with the task request that pertains to execution and facilitation of the task request to allow the at least one agent of the agent pool to accept an unassigned task that is associated with the at least one request attribute, the content of the task request, and the category of the task request, wherein upon electronic acceptance of the unassigned task by the at least one agent, the unassigned task is electronically processed into a task that is electronically assigned to the at least one agent from the agent pool to execute and fulfill the task request, wherein the computing device used by the at least one agent is electronically controlled to present the task to the at least one agent.

2. The computer-implemented method of claim 1, wherein receiving the task request includes determining an urgency associated with the task request and assigning an urgency value associated with the task request, wherein a window of time in which the agent executes the task and a window of time in which the agent fulfills the task is analyzed to determine the urgency associated with the task request.

3. The computer-implemented method of claim 2, wherein determining the agent pool includes adding the at least one preferred agent and the plurality of third-party agents to the agent pool, wherein the at least one preferred agent and the plurality of third-party agents are added to the agent pool to be possibly selected to execute and fulfill the task request in accordance with the at least one request attribute.

4. The computer-implemented method of claim 2, wherein determining the plurality of candidate locations includes adding at least one preferred location and a plurality of third-party locations as at least one of: a candidate task execution location at which to execute the task request in accordance with the at least one request attribute and a candidate task fulfillment location at which to execute the task request in accordance with the at least one request attribute.

5. The computer-implemented method of claim 4, wherein assigning the task execution location includes determining that the urgency value is above a predetermined threshold associated with the assignment of the task execution location and the task fulfillment location and determining travel distances from each candidate task execution location of the plurality of candidate locations to a location of the requestor of the task request, wherein a candidate task execution location that is a shortest travel distance to the location of the requestor of the task request is assigned as the task execution location.

6. The computer-implemented method of claim 4, wherein assigning the task fulfillment location includes determining that the urgency value is above a predetermined threshold associated with the assignment of the task execution location and the task fulfillment location and determining travel distances from the location of the requestor of the task request to each candidate task fulfillment location of the plurality of candidate locations, wherein a candidate task fulfillment location that is a shortest travel distance from the location of the requestor of the task request is assigned as the task fulfillment location.

7. The computer-implemented method of claim 6, wherein assigning the agent from the agent pool includes determining that the urgency value is above a predetermined threshold associated with the assignment of the agent and evaluating agents of the agent pool to select an agent that is located within a predetermined distance to the task execution location and the task fulfillment location.

8. The computer-implemented method of claim 7, wherein assigning the agent from the agent pool includes determining that the urgency value is below a predetermined threshold and evaluating the agents of the agent pool to select an agent that will execute and fulfill the task request at a lowest price point compared to other agents of the agent pool.

9. The computer-implemented method of claim 1, wherein assigning the agent from the agent pool includes sending the unassigned task associated with the task request to the at least one agent selected from the agent pool and determining that the at least one agent selected from the agent pool accepts the unassigned task, wherein the unassigned task is converted to a task that is associated with the task request and the task is assigned to the agent of the agent pool based on the acceptance of the unassigned task.

10. A system for assigning an agent to execute and fulfill a task request, comprising:
   a memory storing instructions when executed by a processor cause the processor to:
   electronically collect and electronically receive at least one electronic data input, wherein the at least one electronic data input includes at least one of: at least one voice electronic data input that pertains to the task request that is spoken and is electronically received by an electronic microphone of at least one connected device and at least one sensor electronic data input that is electronically received from at least one of: a weight sensor, a camera sensor, and a LiDAR sensor of the at least one connected device; electronically analyze the electronic data input to electronically determine the task request based on at least one of: electronic multimodal processing of the at least one voice electronic data input to electronically perform speech pattern recognition to determine at least one phrase that is electronically received by the connected device and execution of at least one of: weight logic, image logic, and LiDAR logic that is stored in an associated memory to electronically interpret a requirement to be fulfilled based on the at least one sensor input to electronically determine at least one request attribute that is associated with the task request;

electronically determine an agent pool to execute and fulfill the task request in accordance with the at least one request attribute based on electronic analysis of data stored upon at least one database that includes data pertaining to at least one preferred agent, electronic analysis of data stored upon at least one additional database that includes data pertaining to at least one agent previously used to execute and fulfill a previous task request, and electronic analysis of data pertaining to a plurality of third-party agents received from at least one computing engine that is configured to communicate with at least one third-party vendor;

electronically analyze electronic data pertaining to a content of the task request and a category of the task request to determine a plurality of candidate locations at which to execute the task request and a plurality of candidate locations at which to fulfill the task request;

electronically assign a task execution location and a task fulfillment location from the plurality of candidate locations at which to execute the task request and the plurality of candidate locations at which to fulfill the task request; and electronically present a task user interface that includes the at least one request attribute associated with the task request through a computing device used by a requestor to be electronically accepted through the task user interface, wherein upon electronic acceptance of the at least one request attribute associated with the task request by the requestor a computing device used by at least one agent of the agent pool is electronically controlled to present an unassigned task user interface that includes the at least one request attribute associated with the task request that pertains to execution and facilitation of the task request to allow the at least one agent of the agent pool to accept an unassigned task that is associated with the at least one request attribute, the content of the task request, and the category of the task request, wherein upon electronic acceptance of the unassigned task by the at least one agent, the unassigned task is electronically processed into a task is electronically assigned to the at least one agent from the agent pool to execute and fulfill the task request, wherein the computing device used by the at least one agent is electronically controlled to present the task to the at least one agent.

11. The system of claim 10, wherein receiving the task request includes determining an urgency associated with the task request and assigning an urgency value associated with the task request, wherein a window of time in which the agent executes the task and in which the agent fulfills the task is analyzed to determine the urgency associated with the task request.

12. The system of claim 11, wherein determining the agent pool includes adding the at least one preferred agent and the plurality of third-party agents to the agent pool, wherein the at least one preferred agent and the plurality of third-party agents are added to the agent pool to be possibly selected to execute and fulfill the task request in accordance with the at least one request attribute.

13. The system of claim 11, wherein determining the plurality of candidate locations includes adding at least one preferred location and a plurality of third-party locations as at least one of: a candidate task execution location at which to execute the task request in accordance with the at least one request attribute and a candidate task fulfillment location at which to execute the task request in accordance with the at least one request attribute.

14. The system of claim 13, wherein assigning the task execution location includes determining that the urgency value is above a predetermined threshold associated with the assignment of the task execution location and the task fulfillment location and determining travel distances from each candidate task execution location of the plurality of candidate locations to a location of the requestor of the task request, wherein a candidate task execution location that is a shortest travel distance to the location of the requestor of the task request is assigned as the task execution location.

15. The system of claim 13, wherein assigning the task fulfillment location includes determining that the urgency value is above a predetermined threshold associated with the assignment of the task execution location and the task fulfillment location and determining travel distances from the location of the requestor of the task request to each candidate task fulfillment location of the plurality of candidate locations, wherein a candidate task fulfillment location that is a shortest travel distance from the location of the requestor of the task request is assigned as the task fulfillment location.

16. The system of claim 15, wherein assigning the agent from the agent pool includes determining that the urgency value is above a predetermined threshold associated with the assignment of the agent and evaluating agents of the agent pool to select an agent that is located within a predetermined distance to the task execution location and the task fulfillment location.

17. The system of claim 16, wherein assigning the agent from the agent pool includes determining that the urgency value is below a predetermined threshold and evaluating the agents of the agent pool to select an agent that will execute and fulfill the task request at a lowest price point compared to other agents of the agent pool.

18. The system of claim 10, wherein assigning the agent from the agent pool includes sending the unassigned task associated with the task request to the at least one agent selected from the agent pool and determining that the at least one agent selected from the agent pool accepts the unassigned task, wherein the unassigned task is converted to a task that is associated with the task request and the task is assigned to the agent of the agent pool based on the acceptance of the unassigned task.

19. A non-transitory computer readable storage medium storing instructions that when executed by a computer, which includes a processor perform a method, the method comprising:

electronically collecting and electronically receiving at least one electronic data input, wherein the at least electronic one data input includes at least one of: at least one voice electronic data input that pertains to a task request that is spoken and is electronically received by an electronic microphone of at least one connected device and at least one electronic sensor data input that is electronically received from at least one of: a weight sensor, a camera sensor, and a LiDAR sensor of the at least one connected device;

electronically analyzing the electronic data input to electronically determine the task request based on at least one of: electronic multimodal processing of the at least one voice electronic data input to electronically perform speech pattern recognition to determine at least one phrase that is electronically received by the connected device and execution of at least one of: weight logic, image logic, and LiDAR logic that is stored in an associated memory to electronically interpret a requirement to be fulfilled based on the at least one sensor input to electronically determine at least one request attribute that is associated with the task request;

electronically determining an agent pool to execute and fulfill the task request in accordance with the at least one request attribute based on electronic analysis of data stored upon at least one database that includes data pertaining to at least one preferred agent, electronic analysis of data stored upon at least one additional database that includes data pertaining to at least one agent previously used to execute and fulfill a previous task request, and electronic analysis of data pertaining to a plurality of third-party agents received from at least one computing engine that is configured to communicate with at least one third-party vendor;

electronically analyzing electronic data pertaining to a content of the task request and a category of the task request to determine a plurality of candidate locations at which to execute the task request and a plurality of candidate locations at which to fulfill the task request;

electronically assigning a task execution location and a task fulfillment location from the plurality of candidate locations at which to execute the task request and the plurality of candidate locations at which to fulfill the task request; and electronically presenting a task user interface that includes the at least one request attribute associated with the task request through a computing device used by a requestor to be electronically accepted through the task user interface, wherein upon electronic acceptance of the at least one request attribute associated with the task request by the requestor a computing device used by at least one agent of the agent pool is electronically controlled to present an unassigned task user interface that includes the at least one request attribute associated with the task request that pertains to execution and facilitation of the task request to allow the at least one agent of the agent pool to accept an unassigned task that is associated with the at least one request attribute, the content of the task request, and the category of the task request, wherein upon electronic acceptance of the unassigned task by the at least one agent, the unassigned task is electronically processed into a task that is electronically assigned to the at least one agent from the agent pool to execute and fulfill the task request, wherein the computing device used by the at least one agent is electronically controlled to present the task to the at least one agent.

20. The non-transitory computer readable storage medium of claim 19, wherein assigning the agent from the agent pool includes sending the unassigned task associated with the task request to the at least one agent selected from the agent pool and determining that the at least one agent selected from the agent pool accepts the unassigned task, wherein the unassigned task is converted to a task that is associated with the task request and the task is assigned to the agent of the agent pool based on the acceptance of the unassigned task.

* * * * *